(12) United States Patent  (10) Patent No.: US 8,172,325 B2
Mather et al.  (45) Date of Patent: May 8, 2012

(54) MOTOR VEHICLE SEAT ASSEMBLY

(75) Inventors: Carl Mather, Lake Orion, MI (US); Timothy W. Grogan, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/030,707

(22) Filed: Feb. 18, 2011

(65) Prior Publication Data

US 2011/0148163 A1 Jun. 23, 2011

Related U.S. Application Data

(62) Division of application No. 12/049,654, filed on Mar. 17, 2008, now Pat. No. 7,891,737.

(60) Provisional application No. 60/895,235, filed on Mar. 16, 2007.

(51) Int. Cl.
*B60N 2/10* (2006.01)
(52) U.S. Cl. ............................ 297/334; 296/65.09
(58) Field of Classification Search .................. 297/334; 296/65.09
See application file for complete search history.

(56) References Cited

U.S. PATENT DOCUMENTS

| | | | | |
|---|---|---|---|---|
| 6,123,380 A * | 9/2000 | Sturt et al. | ................ | 296/65.09 |
| 6,196,613 B1 * | 3/2001 | Arai | ...................... | 297/334 X |
| 6,334,643 B1 * | 1/2002 | Lindblad et al. | ........... | 296/65.09 |
| 6,375,255 B1 * | 4/2002 | Maruta et al. | .......... | 296/65.09 X |
| 7,497,517 B2 * | 3/2009 | Gundall et al. | ........... | 297/334 X |

* cited by examiner

*Primary Examiner* — Anthony D Barfield
(74) *Attorney, Agent, or Firm* — Frederick A. Krieger

(57) ABSTRACT

According to one embodiment of a seat assembly for a motor vehicle a seat back pivots about a hip axis, a seat bottom pivots about a knee axis, and at least one seat bottom leg is pivots about an ankle axis, so that the seat back folds down against the seat bottom and the seat bottom kneels on the floor to at least partially define a seating load floor. According to another embodiment, a seat bottom and a seat back are articulatable in a forward direction to fold the seat bottom and back down toward a floor of the vehicle to at least partially define a seating load floor.

12 Claims, 45 Drawing Sheets

MOTOR VEHICLE SEAT ASSEMBLY

CROSS-REFERENCE TO RELATED APPLICATIONS

This application is a Divisional of U.S. patent application Ser. No. 12/049,654 filed on Mar. 17, 2008 now U.S. Pat. No. 7,891,737; which claims the benefit of U.S. Provisional Application Ser. No. 60/895,235 filed on Mar. 16, 2007.

TECHNICAL FIELD

The present invention relates generally to seat assemblies for motor vehicles and, more particularly, to hinged seat assemblies convertible to load floors of the motor vehicle.

BACKGROUND

In motor vehicle design, it is advantageous to provide a seat assembly which is capable of providing improved storage capacity when the seat assembly is not in use. One potential solution to this need for additional storage capacity is a seat assembly which is capable of providing a flat load floor by folding the seat back down onto the seat cushion. However, one drawback of current seat assemblies is that the seat backs rest on top of the seat bottom cushion causing an increase in the stacked height of the seat in its relatively high load floor position and, thus, reducing the available cargo volume.

It is further advantageous to provide a seat assembly which, in its second row position, is capable of providing increased ingress and egress to the third row seats for additional passengers. While it is known in the prior art to provide a seat which tips forward to provide access to the third row seats, one drawback of such seat assemblies is that the seats must either be maintained in the tipped position if extra storage is desired which will decrease the available forward storage capacity, or that that the seat backs rest on top of the seat bottom cushion causing an increase in the stacked height of the seat in its load floor position and reducing the available cargo volume.

SUMMARY

According to one embodiment of a seat assembly for a motor vehicle including a floor, at least one seat bottom leg has an upper end, and a lower end pivotably mountable with respect to the floor of the motor vehicle to be pivotable about an ankle axis. Also, a seat bottom has a rearward portion, and a forward portion pivotally coupled to the upper end of the at least one seat bottom leg to be pivotable about a knee axis. Further, a seat back has a lower portion pivotally coupled to the rearward portion of the seat bottom to be pivotable about a hip axis, wherein the seat back pivots about the hip axis, the seat bottom pivots about the knee axis, and the at least one seat bottom leg pivots about the ankle axis, so that the seat back folds down against the seat bottom and the seat bottom kneels on the floor to at least partially define a seating load floor.

According to another embodiment of a seat assembly for a motor vehicle including a floor, at least one seat bottom leg has an upper end, and a lower end pivotably mountable with respect to the floor of the motor vehicle to be pivotable about a seat bottom leg pivot axis. Also, at least one seat bottom link has a seat bottom end, and a leg end pivotally coupled to the upper end of the at least one seat bottom leg to be pivotable about a link pivot axis. Further, a seat bottom includes a rearward portion, and a forward portion pivotally coupled to the seat bottom end of the at least one seat bottom link to be pivotable about a seat bottom pivot axis. Finally, a seat back includes a lower portion articulatably mountable with respect to the floor of the motor vehicle, wherein the seat bottom and the seat back are articulatable in a forward direction to fold the seat bottom and seat back down toward the floor of the vehicle to at least partially define a seating load floor.

BRIEF DESCRIPTION OF THE DRAWINGS

Additional features and understanding of the present invention will become more fully apparent from the attached description and accompanying drawings, wherein.

DETAILED DESCRIPTION OF THE PREFERRED EMBODIMENTS

Figure 1:
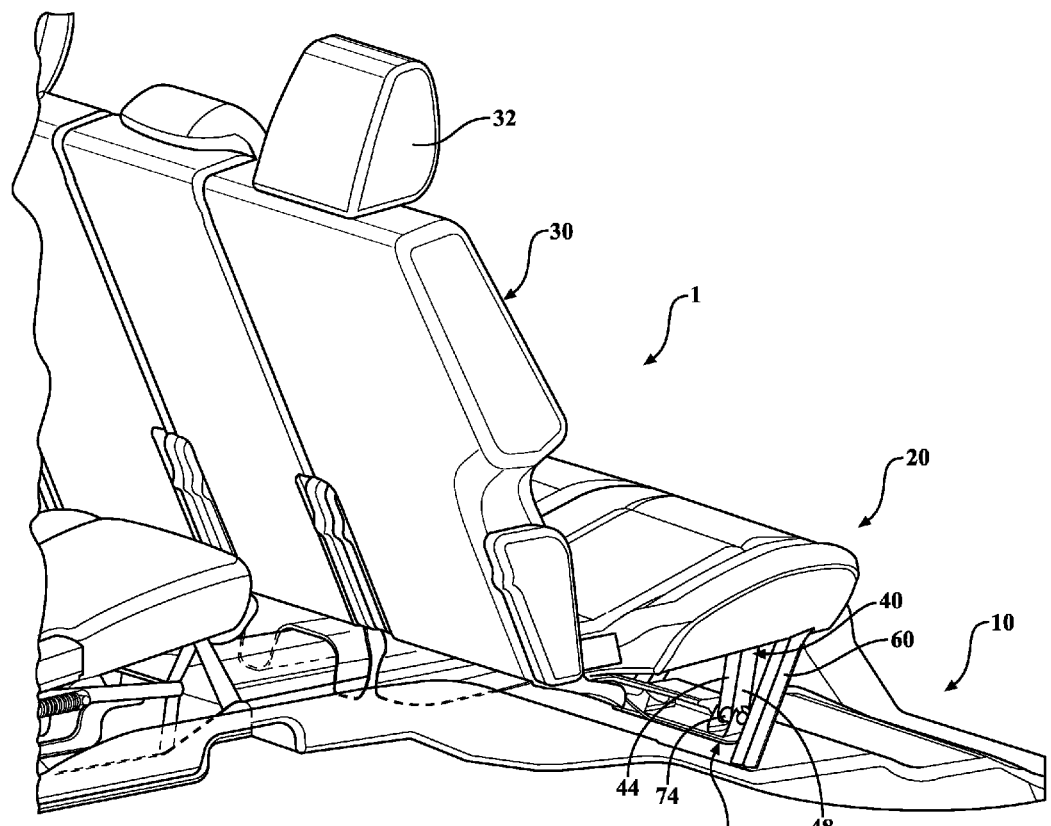
FIG. 1 is a right rear perspective view of a first exemplary embodiment of a plurality of seat assemblies of a vehicle.
Figure 2:
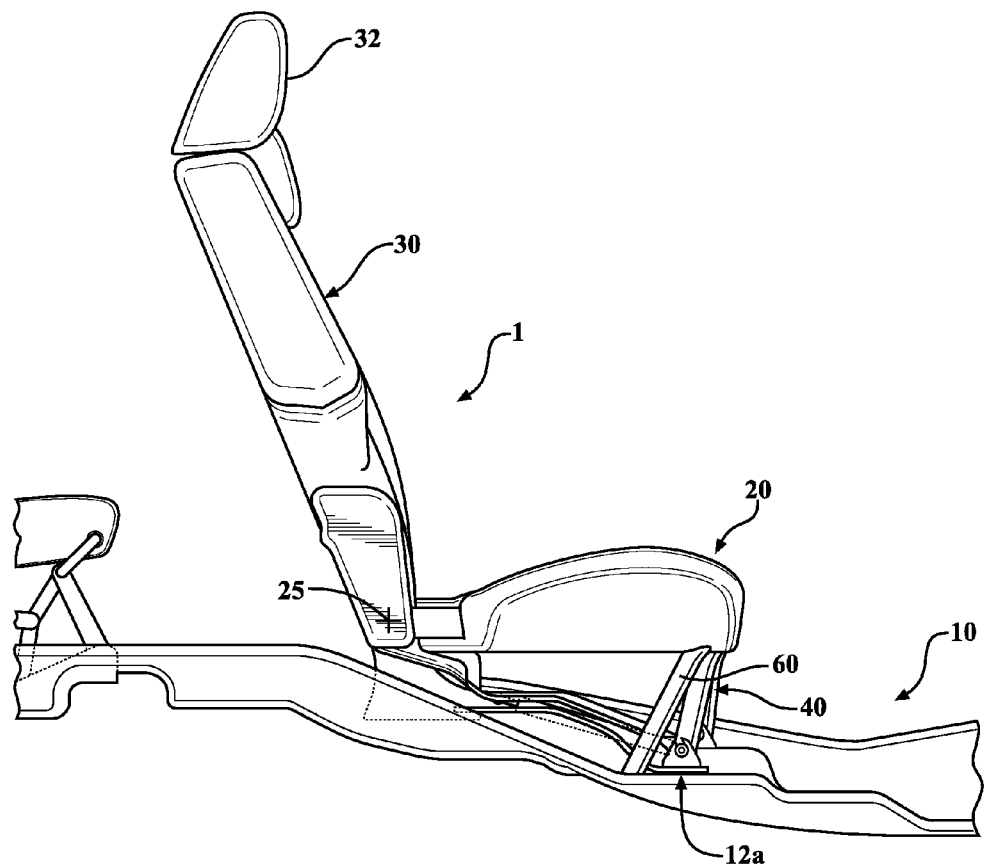
FIG. 2 is a right side view of a right seat assembly of the seat assemblies of FIG. 1.
Figure 7:
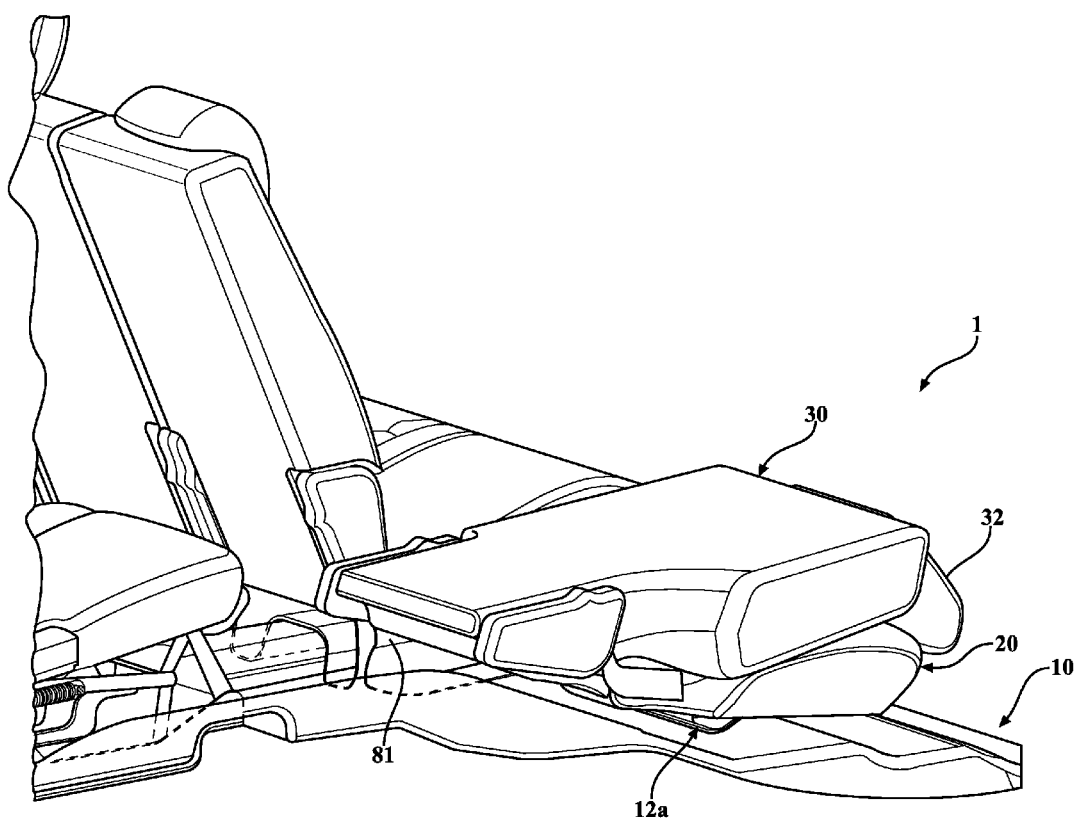
FIG. 7 is a right rear perspective view of the plurality of seat assemblies of FIG. 1, illustrating the right seat assembly in the stowed position to define at least a portion of a seating load floor.
Figure 8:
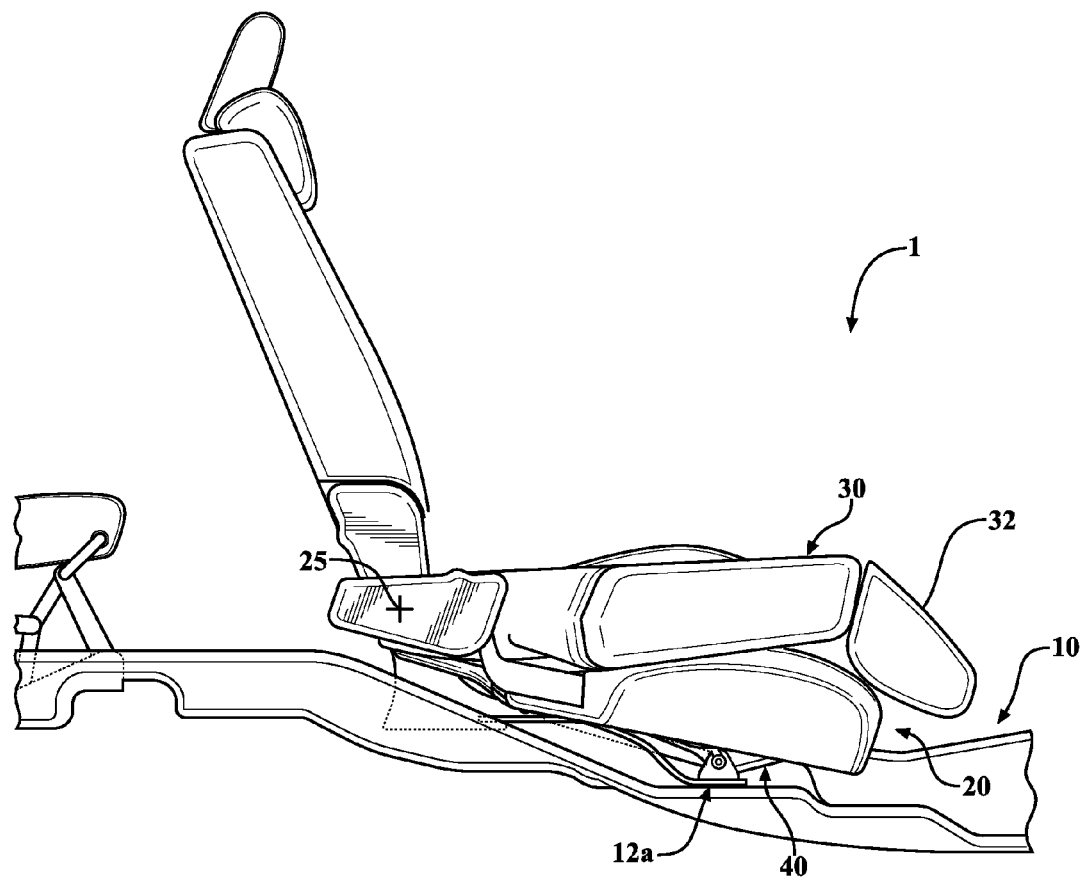
FIG. 8 is a right side view of the right seat assembly shown in FIG. 7.
Figure 9:
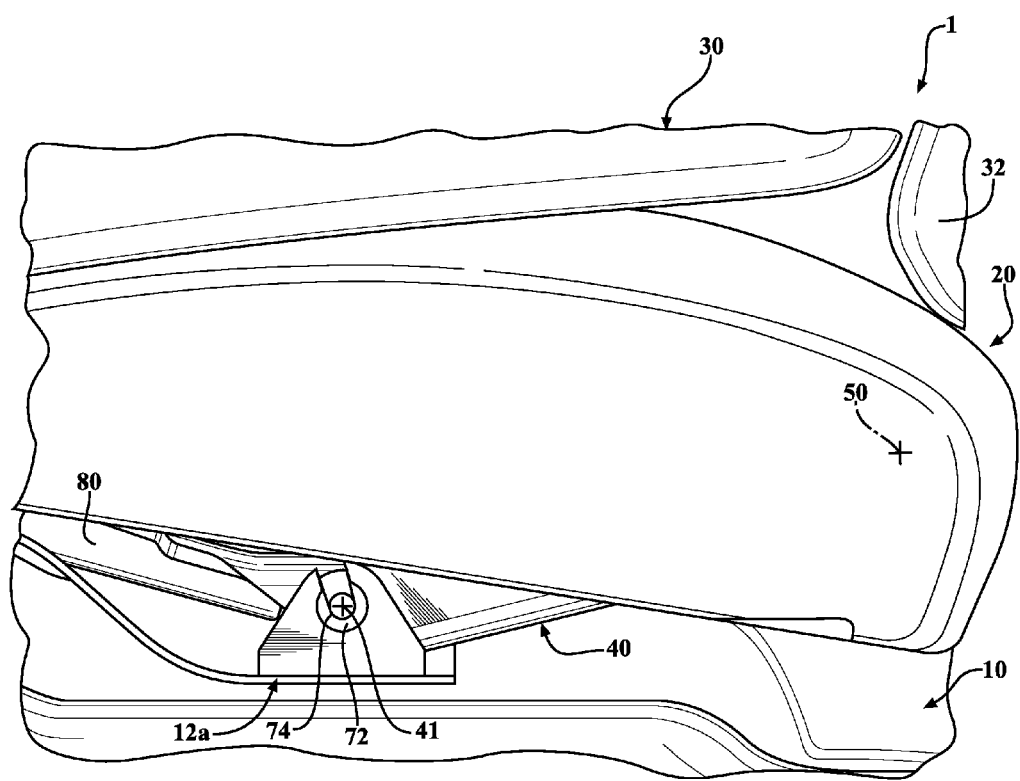
FIG. 9 is an enlarged right side view of the forward portion of the right seat assembly of FIG. 8.
Figure 10:
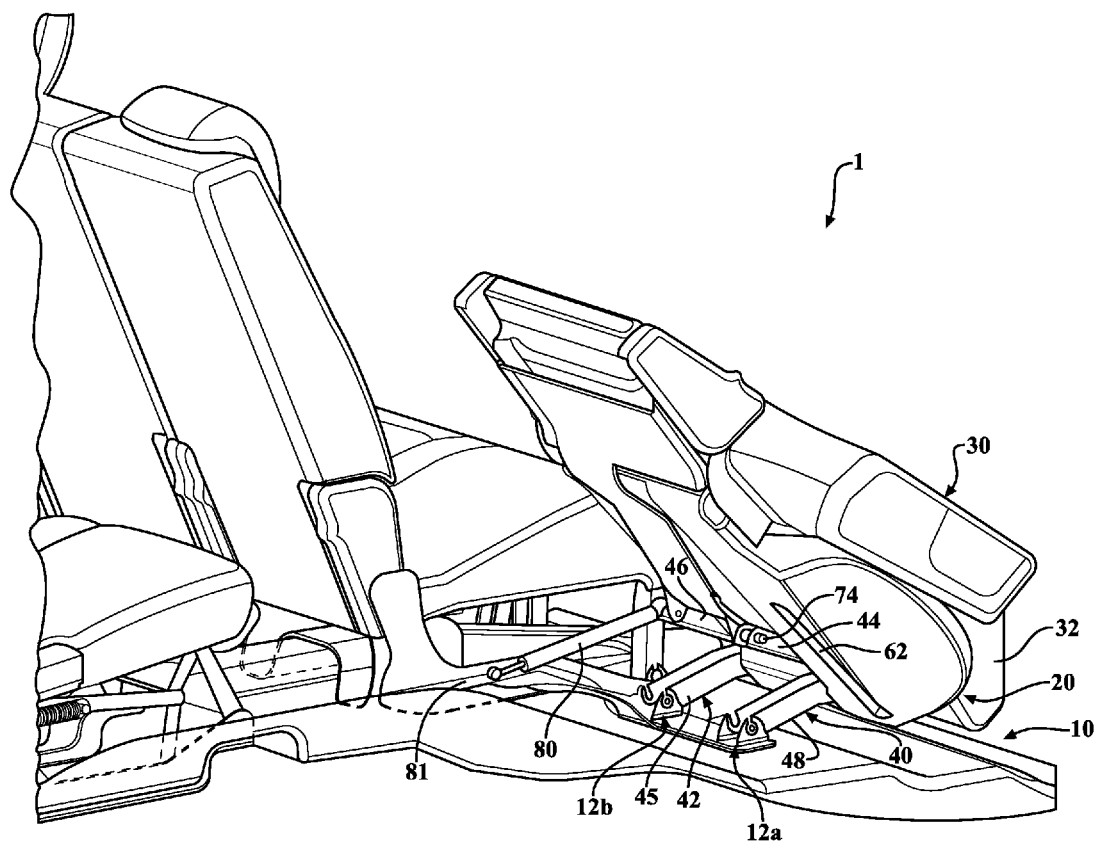
FIG. 10 is a right rear perspective view of the plurality of seat assemblies of FIG. 1, illustrating the right seat assembly being moved toward a kneeled and tipped position.
Figure 11:
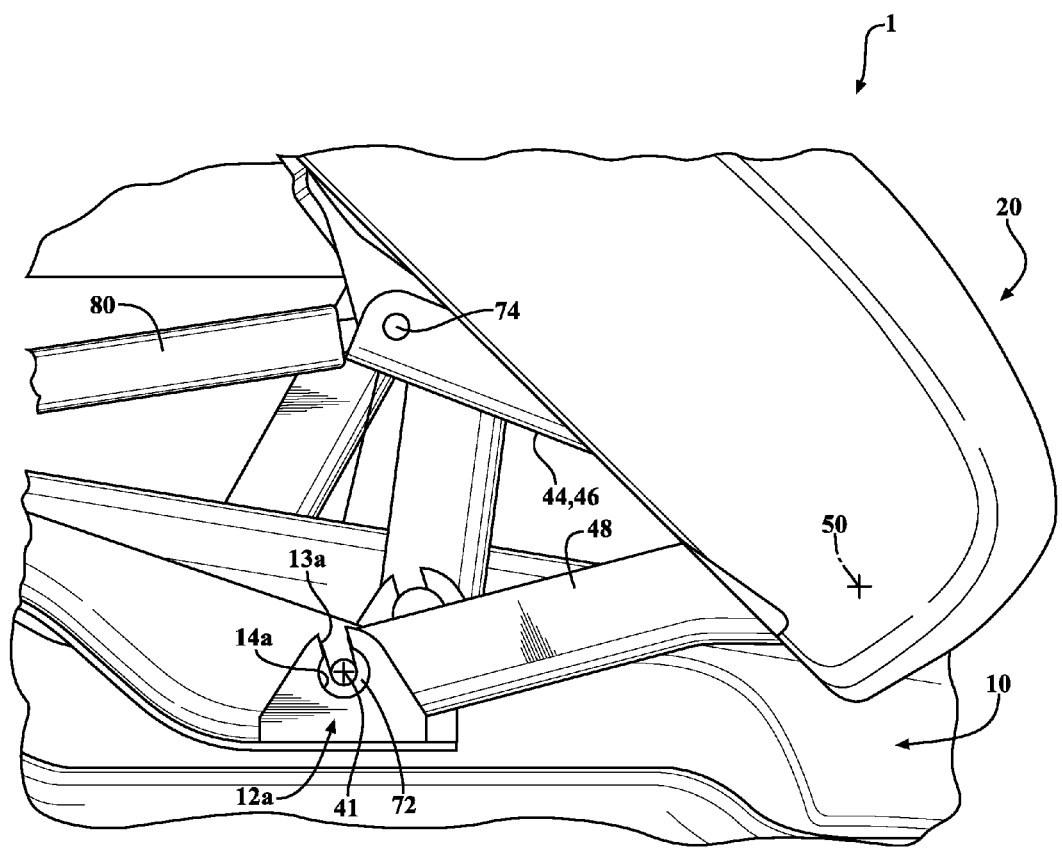
FIG. 11 is an enlarged right side view of the forward portion of the right seat assembly of FIG. 10.
Figure 12:
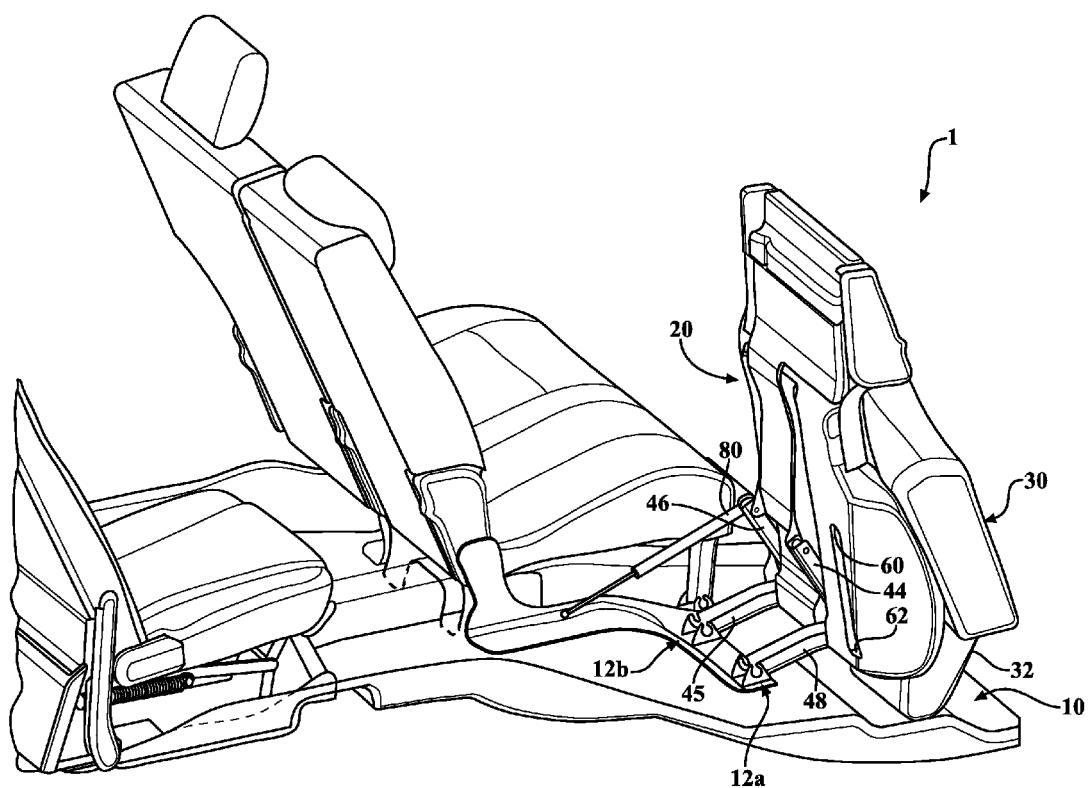
FIG. 12 is a right rear perspective view of the plurality of seat assemblies of FIG. 1, illustrating the right seat assembly in the kneeled and tipped position.
Figure 13:
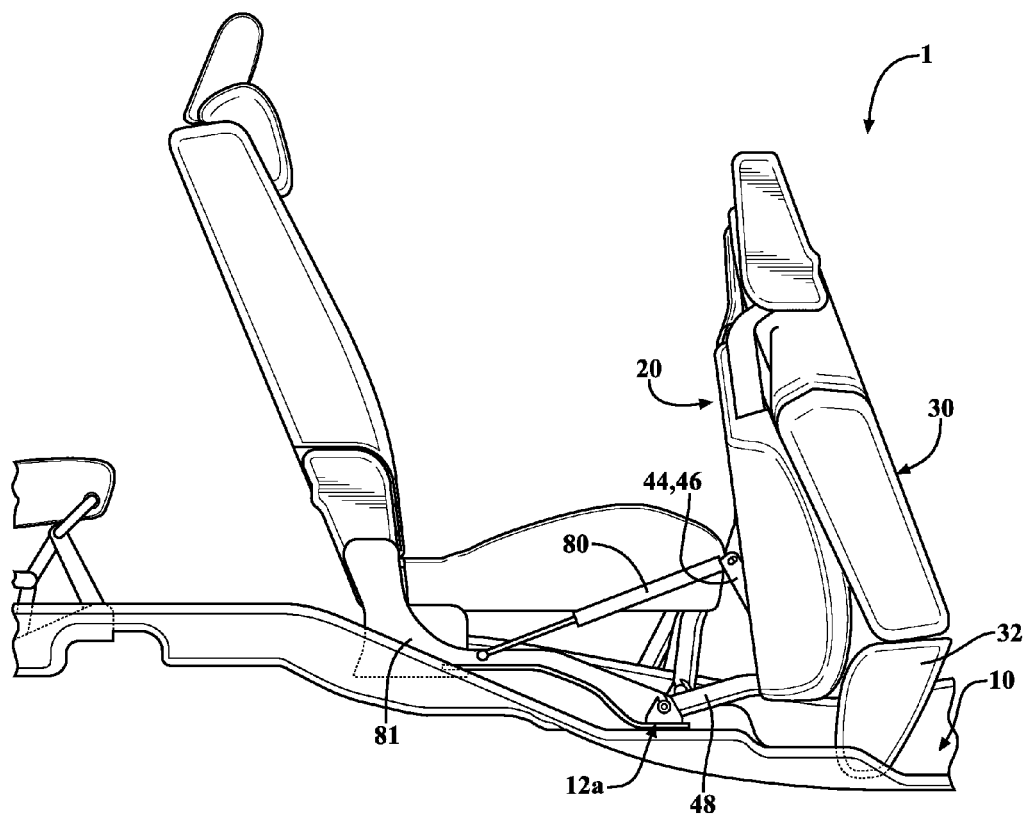
FIG. 13 is a side view of the right seat assembly shown in FIG. 12.
Figure 14:
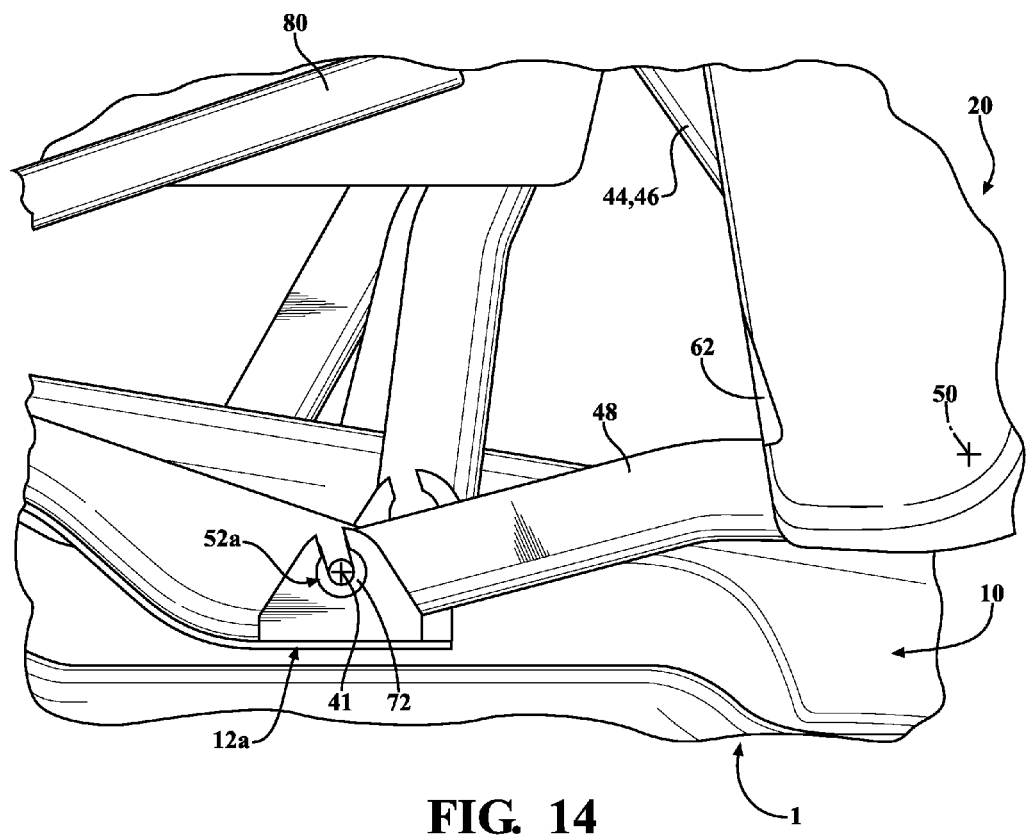
FIG. 14 is an enlarged right side view of the forward portion of the right seat assembly of FIG. 13.

FIGS. 1-21 illustrate a first exemplary embodiment of a seat assembly 1 for a motor vehicle having a floor 10. In the seat assembly 1, a seat bottom 20 is pivotally coupled to a seat back 30 in any suitable manner. As shown, the seat assembly 1 may be for a second row of seating that may include a plurality of similar seat assemblies in side-by-side arrangement. The seat assembly 1 is capable of being pivoted between a first, seated position (as best shown in FIGS. 1 and 2) in which a passenger may be seated in the seat assembly, a second relatively low profile stowed position (as best shown in FIGS. 7 and 8) in which the seat bottom 20 kneels and the seat back 30 is folded flat onto the seat bottom 20, and a third, kneeled and tipped position (as best shown in FIGS. 12 and 13) in which the seat assembly 1 is kneeled and tipped forward to permit passenger ingress and egress to and from a third row of seats (not shown) located behind the seat assembly 1.

The seat bottom 20 and seat back 30 may include frames or other structural members, cushions, covers, and/or the like. The seat back 30 includes a lower portion pivotally coupled in any suitable manner to a rearward portion of the seat bottom 20 to be pivotable about a seat back folding axis or hip axis 25 (e.g. FIG. 2). A head rest 32 may be provided and pivotally coupled to the seat back 30 (e.g. FIGS. 1-2).

Figure 3:
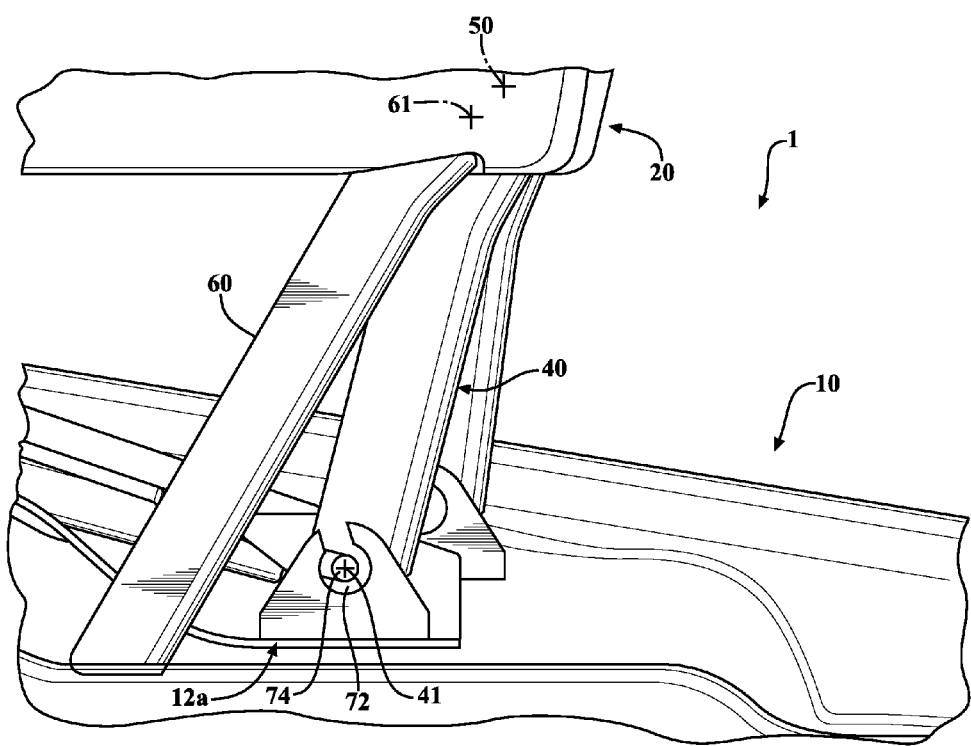
FIG. 3 is an enlarged right side view of a forward portion of the right seat assembly of FIG. 2.
Figure 4:
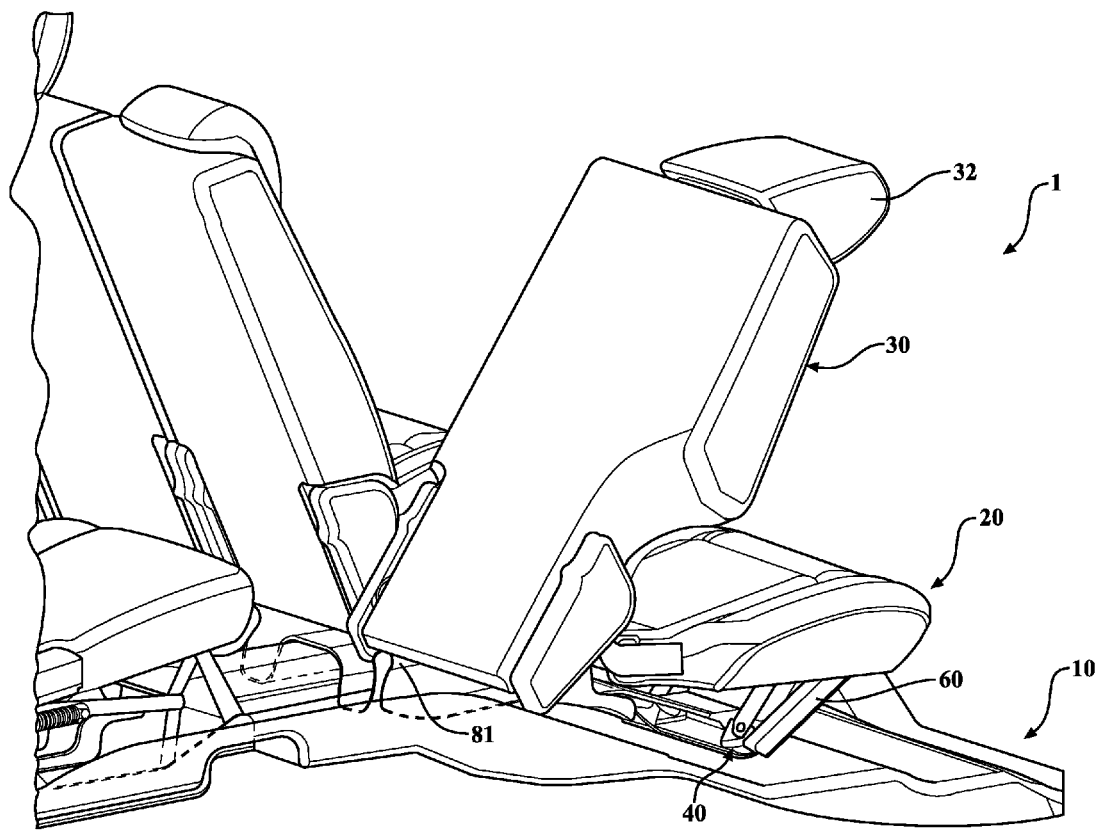
FIG. 4 is a right rear perspective view of the plurality of seat assemblies of FIG. 1, illustrating the right seat assembly being moved or collapsed toward a stowed position.

The seat bottom 20 is articulatably mountable with respect to the floor 10 of the vehicle about a seat bottom pivot axis or ankle axis 41 and a knee axis 50 (e.g. FIG. 3). More specifically, the seat bottom 20 may be pivotally coupled to the floor 10 by two seat bottom leg assemblies 40, 42, which are pivotally coupled to a forward portion of the seat bottom 20 about the seat bottom leg axis or knee axis 50 and are pivotally coupled to brackets 12a, 12b attached to the floor 10 about the ankle axis 41 (e.g. FIGS. 3 and 10).

Referring to FIG. 3, the seat bottom 20 is supported by a stabilizer leg 60, which includes a first end pivotally coupled to a forward portion of the seat bottom 20 about a stabilizer leg pivot axis 61 and a second end that is locatable against the vehicle floor 10. In the deployed position, the stabilizer leg 60 rests on the floor 10 of the vehicle to provide additional support structure for the seat assembly 1. However, as the seat assembly 1 is pivoted from the deployed position to the stowed position shown in FIG. 10, the stabilizer leg 60 pivots about the pivot axis 61 into a refracted position in which the stabilizer leg 60 (e.g. FIG. 3) locates within a recess 62 (e.g. FIGS. 10 and 12) in an underside of the seat bottom 20. As the seat assembly 1 is further pivoted from the stowed position into the kneeled and tipped position as shown in FIG. 12, the stabilizer leg 60 remains in the retracted position to permit unimpaired access to the third row of seats located behind the seat assembly 1. The stabilizer leg 60 is positioned laterally outboard of the seat bottom leg assemblies 40, 42, which may be located as far inboard as possible to further enhance unimpaired access to the third row of seats located behind the seat assembly.

Each seat bottom leg assembly 40, 42 may further include an outer seat bottom leg 45, 48 and an inner seat bottom leg 44, 46 (FIGS. 10-12) nested inside the outer seat bottom leg 45, 48 in the deployed position. The legs 44, 45, 46, and 48 are pivotally coupled to the seat bottom 20 about the knee axis 50 and are pivotable about the ankle axis 41 (e.g. FIG. 11). More specifically, the inner and outer seat bottom legs 44, 45, 46, 48 include upper ends pivotally coupled to the forward portion of the seat bottom 20 to be pivotable about the knee axis 50.

The outer seat bottom legs 45, 48 are further pivotably mountable to the floor 10. For example, the outer legs 45, 48 may include lower ends pivotally coupled to the brackets 12*a*, 12*b* (FIG. 10) attached to the floor 10 of the vehicle through hollow pins 72 (e.g. FIGS. 3, 6, 9) which are pivotally carried by the brackets 12*a*, 12*b*. The brackets 12*a*, 12*b* include notched openings or bracket slots 13*a*, 13*b* substantially at the tops of the brackets 12*a*, 12*b* for receiving the pins 72.

The inner seat bottom legs 44, 46 are also pivotably and detachably mountable with respect to the floor 10 about the ankle axis 41. For example, the pivot legs 44, 46 may be pivotally and detachedly coupled to the brackets 12*a*, 12*b* through pins 74 (e.g. FIGS. 3, 6, 9) which are arranged to nest in pivot slots 14*a*, 14*b* provided in the hollow pins 72. The pins 74 are releasable or detachable from the pivot slots 14*a*, 14*b* when the pivot slots 14*a*, 14*b* align with the bracket slots 13*a*, 13*b* upon pivoting of the seat bottom leg assemblies 40, 42 about the ankle axis 41.

Figure 5:
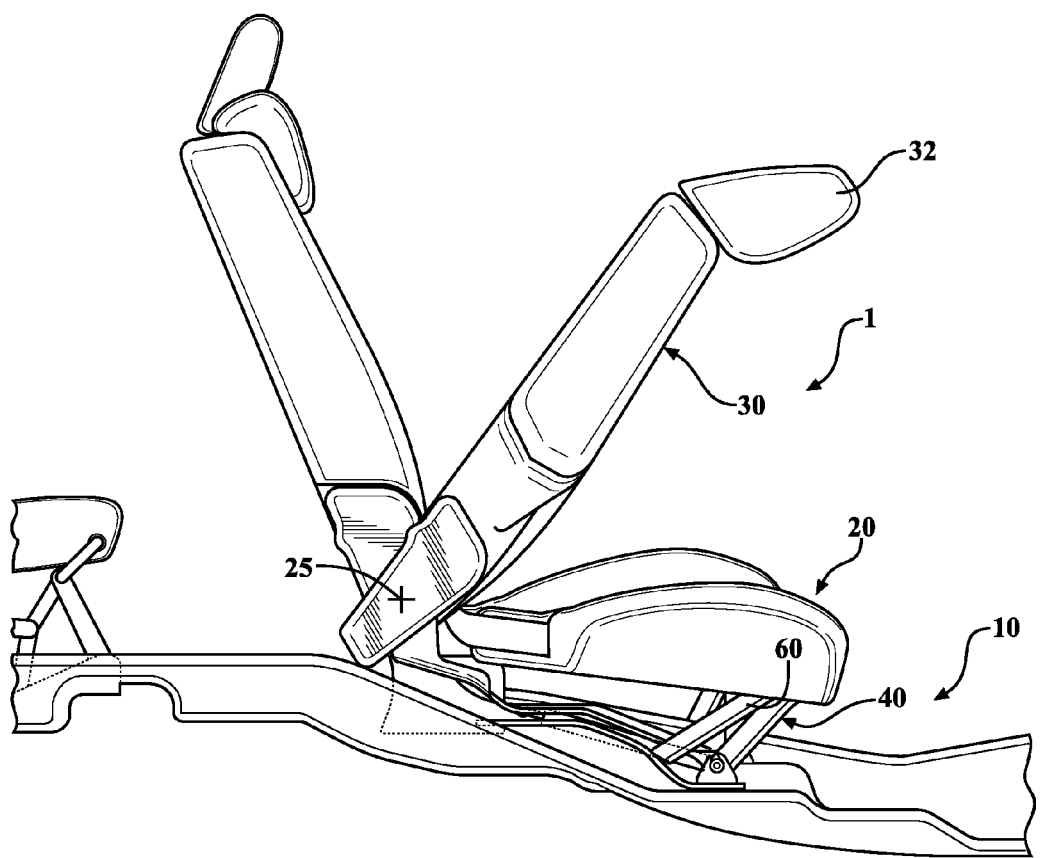
FIG. 5 is a right side view of the right seat assembly shown in FIG. 4.
Figure 6:
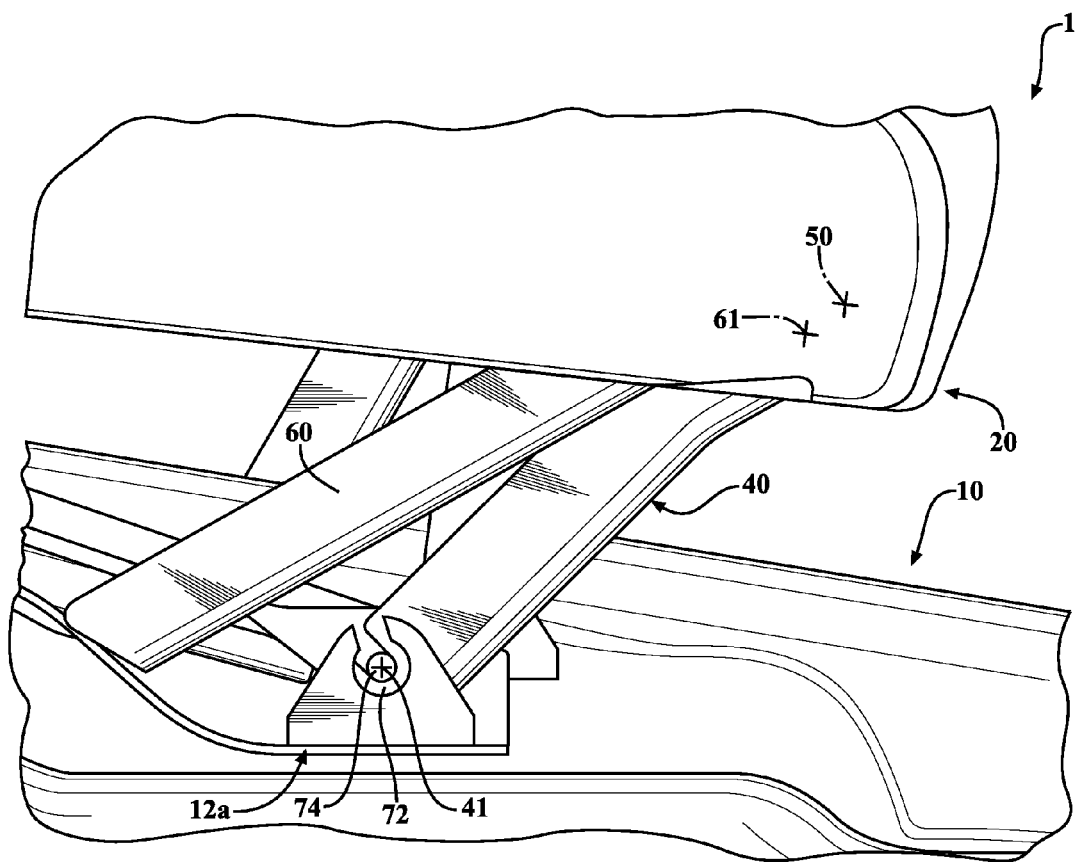
FIG. 6 is an enlarged right side view of the forward portion of the right seat assembly of FIG. 5.

The seat assembly 1 may be moved from the deployed position to the stowed position, wherein the seat back 30 pivots about the hip axis 25, the seat bottom 20 pivots about the knee axis 50, and the bottom leg(s) 40, 42 pivot about the ankle axis 41, so that the seat back 30 folds down against the seat bottom 20 and the seat bottom 20 kneels on the floor 10 to at least partially define a seating load floor. For example, the seat back 30 may be pivoted or folded down onto the seat bottom 20 about the hip axis 25 (FIG. 5). The seat back 30 may be unlatched from its relatively upright deployed position shown in FIG. 1 and pivoted forward in any suitable manner, such as by pulling on a rear mounted strap or lifting a side mounted lever that may be coupled to any suitable seat back latching and unlatching mechanism (not shown). Next, or substantially simultaneously, the seat assembly 1 may be pivoted forward and downward within the vehicle about the pivot leg assemblies 40, 42 so that the seat bottom 20 pivots about the knee axis 50 and the pivot leg assemblies 40, 42 are pivotable about the ankle axis 41 so that the seat assembly 1 kneels until a forward portion of the seat bottom 20 rests on the floor 10 of the vehicle to at least partially define a load floor (e.g. FIG. 7). As the seat assembly 1 is pivoted out of the deployed position, the outer seat bottom leg 45, 48 and inner seat bottom leg 44, 46 are arranged to pivot within the brackets 12*a*, 12*b* in a manner that prevents the inner leg from separating from the outer seat bottom leg 45, 48 and the brackets 12*a*, 12*b* until the seat assembly 1 has been placed in the stowed position. By placing the seat assembly 1 into the stowed position, the cargo capacity above the load floor within the vehicle may be maximized Referring to FIG. 10, once the seat assembly 1 has assumed the stowed position, the seat back 30 and bottom 20 may pivot about the knee axis 50 to raise the lower portion of the seat back 30 and rearward portion of the seat bottom 20. For example, the inner seat bottom leg 44, 46 is arranged to separate or release from the outer legs 45, 48 and the bracket 12 as the lower portion of the inner seat bottom leg 44, 46 pivots in an upward direction away from the floor 10 of the vehicle.

As the inner seat bottom leg 44, 46 pivots upward, a pivot assist device such as a gas strut 80 (e.g. FIGS. 9-14) may be coupled to the inner seat bottom leg 46 and arranged to assist in single handed pivoting of the seat assembly 1 into the kneeled and tipped position. In this manner, it is possible to pivot the seat assembly 1 from the deployed position to the kneeled and tipped position through a simple one-handed operation. The gas strut 80 is further arranged to hold the seat assembly 1 upright in the kneeled and tipped position to permit the occupants to exit the vehicle. The gas strut 80 may include one end pivotably mountable with respect to the floor 10 of the vehicle such as via a bracket 81, which may be fastened or otherwise attached to the vehicle floor 10, and may also include another end pivotally coupled to the lower end of one or both of the inner seat bottom legs 44, 46 to assist with pivoting of the seat back 30 and bottom 20 about the knee axis 50. By placing the seat assembly 1 into the kneeled and tipped position, the ingress and egress to the row of seats located behind the seat assembly 1 may be improved or maximized.

In addition, those skilled in the art will appreciate that the seat assembly 1 may be moved from the kneeled and tipped position back into either the stowed position, or the deployed position by simply reversing the steps described above. For example, the seat assembly may be flipped back to the position shown in FIG. 15 so that a side of the rear portion of the seat bottom 20 may locate on a corresponding portion of the bracket 81 to support the seat assembly 1. Then, the seat assembly 1 may be pivoted backward and upward within the vehicle about the pivot leg assemblies 40, 42 so that the seat bottom 20 pivots about the knee axis 50 and the pivot leg assemblies 40, 42 are pivotable about the ankle axis 41 until the stabilizer leg 60 pivots about its stabilizer leg pivot axis 61 and the second end of the stabilizer leg 60 locates against the vehicle floor 10 to support the seat bottom 20. Finally, the seat back 30 may be returned to its generally upright, deployed position.

Figure 15:
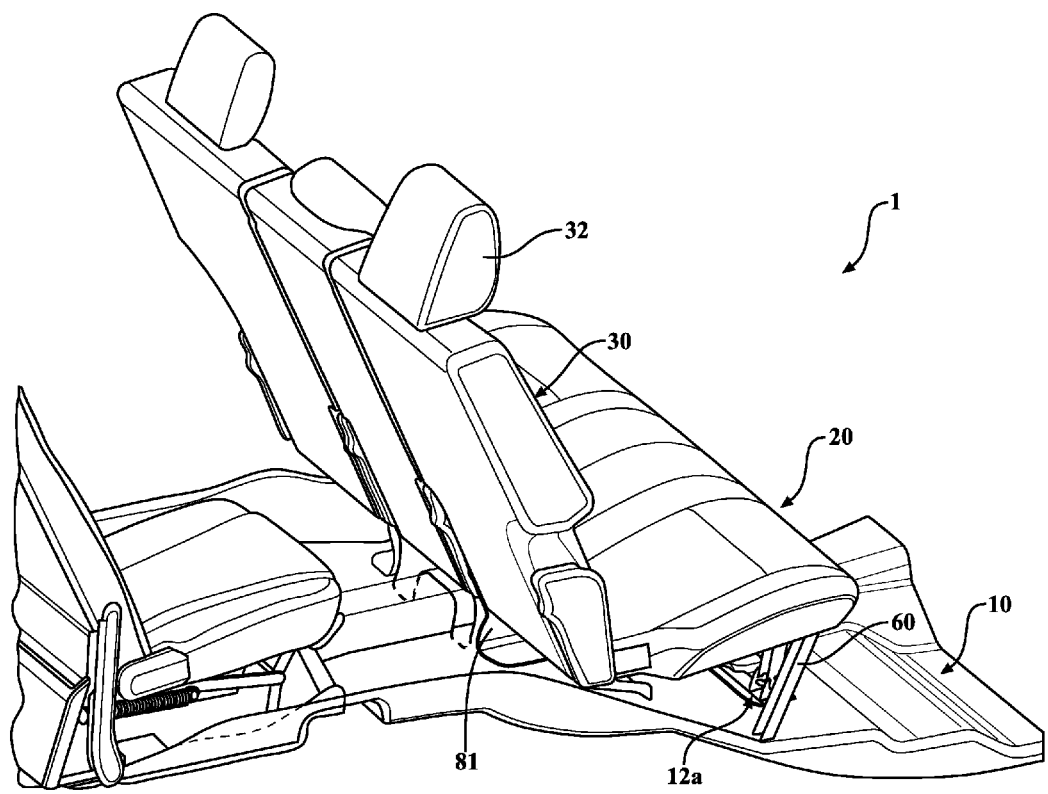
FIG. 15 is a right rear perspective view of the plurality of seat assemblies of FIG. 1, illustrating the right seat assembly returned to its upright position along with center and left seat assemblies.
Figure 16:
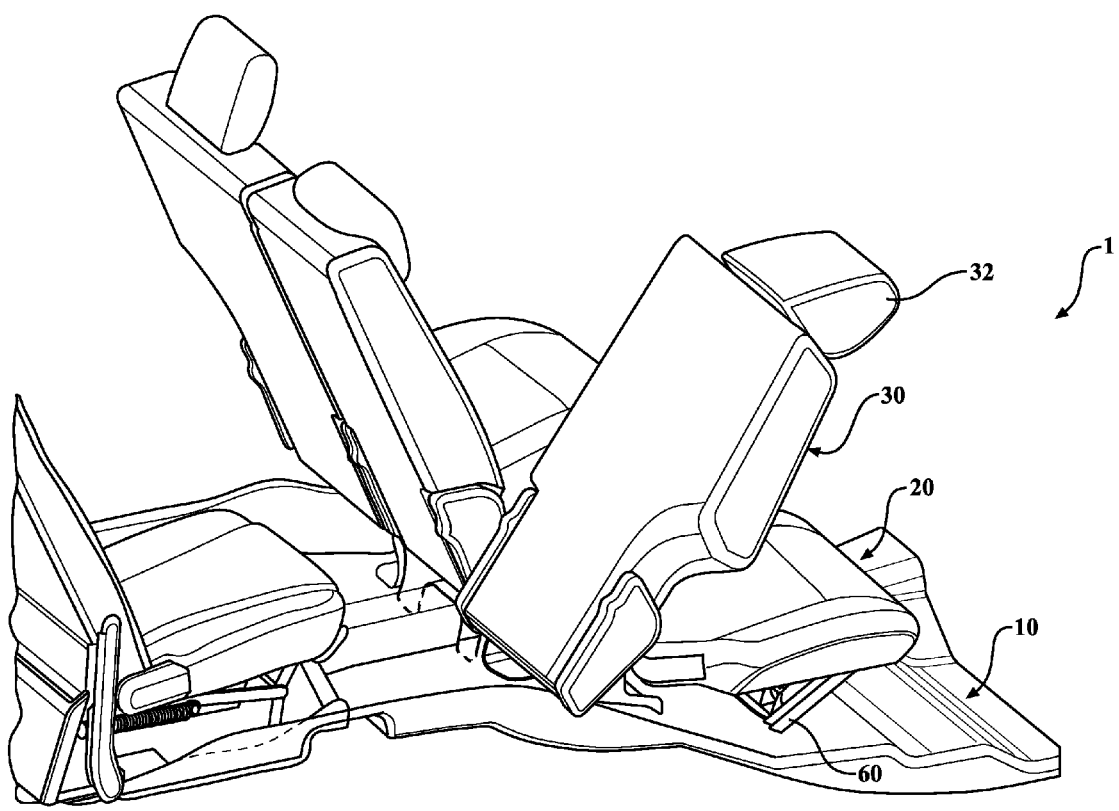
FIG. 16 is a right rear perspective view of the plurality of seat assemblies of FIG. 1, illustrating the right seat assembly being moved or collapsed toward a stowed position.
Figure 17:
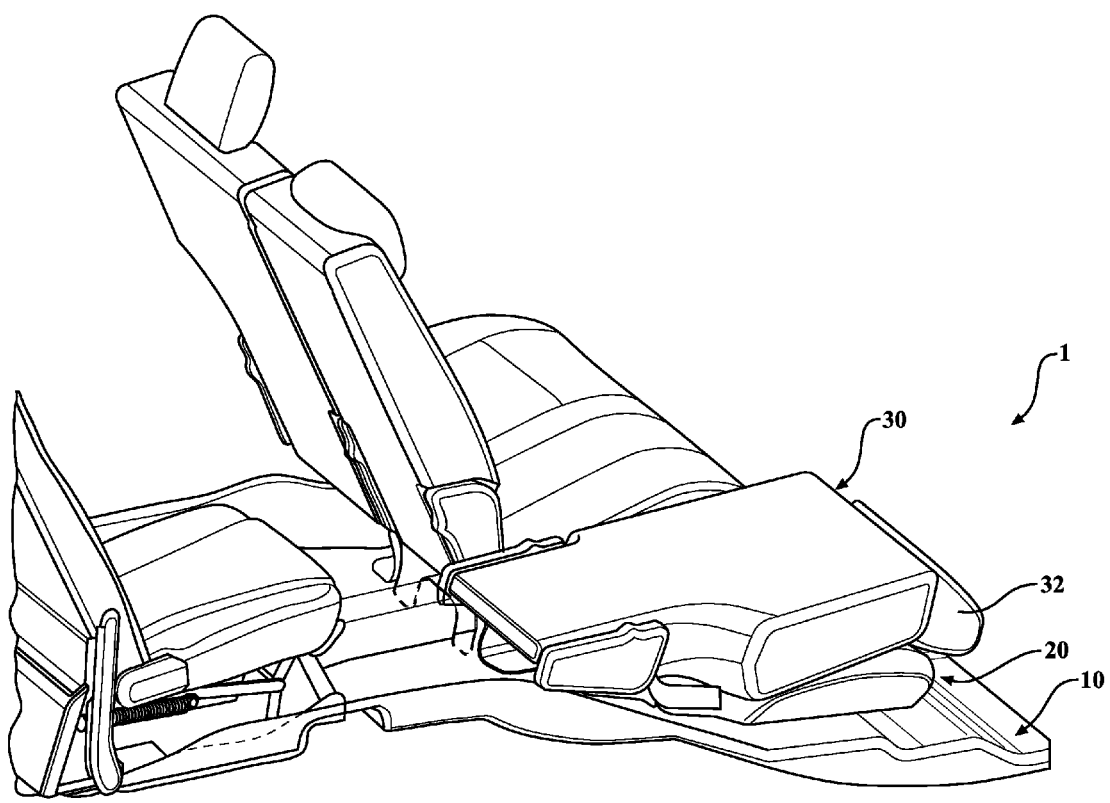
FIG. 17 is a right rear perspective view of the plurality of seat assemblies of FIG. 1, illustrating the right seat assembly in the stowed position.
Figure 18:
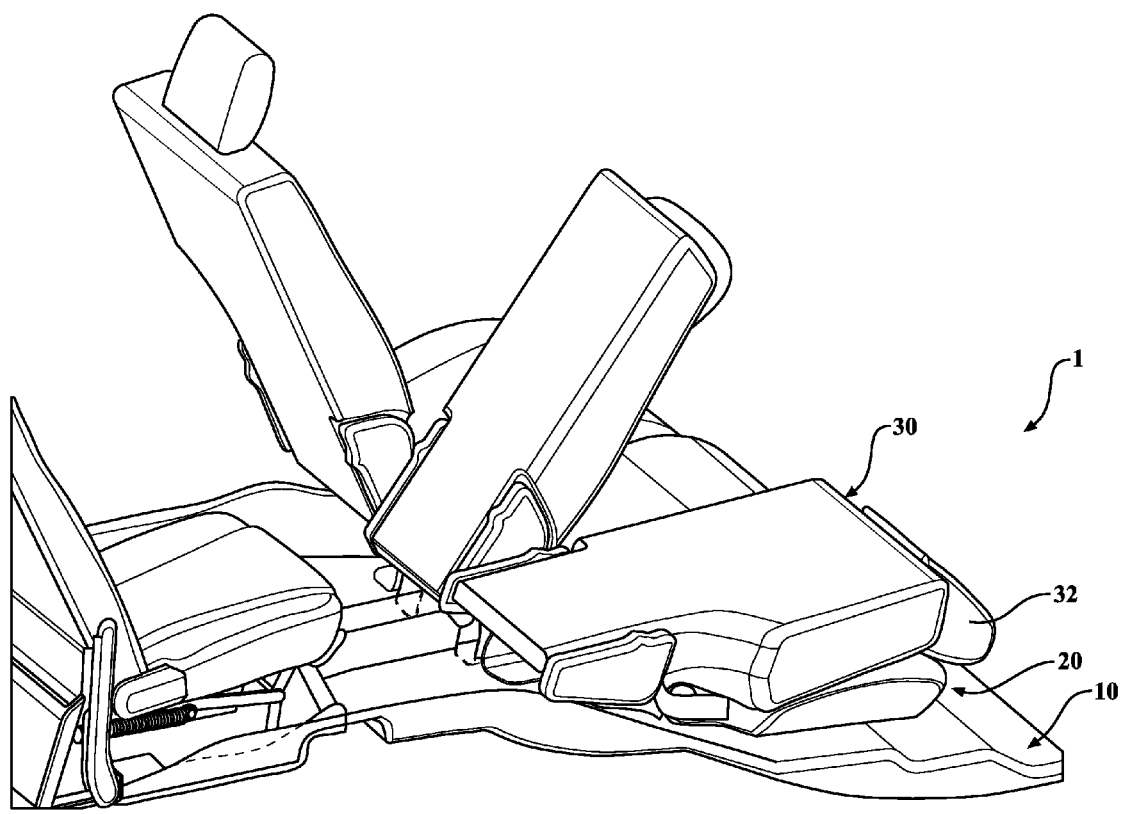
FIG. 18 is a right rear perspective view of the plurality of seat assemblies of FIG. 1, illustrating the center seat assembly being moved or collapsed toward a stowed position.
Figure 19:
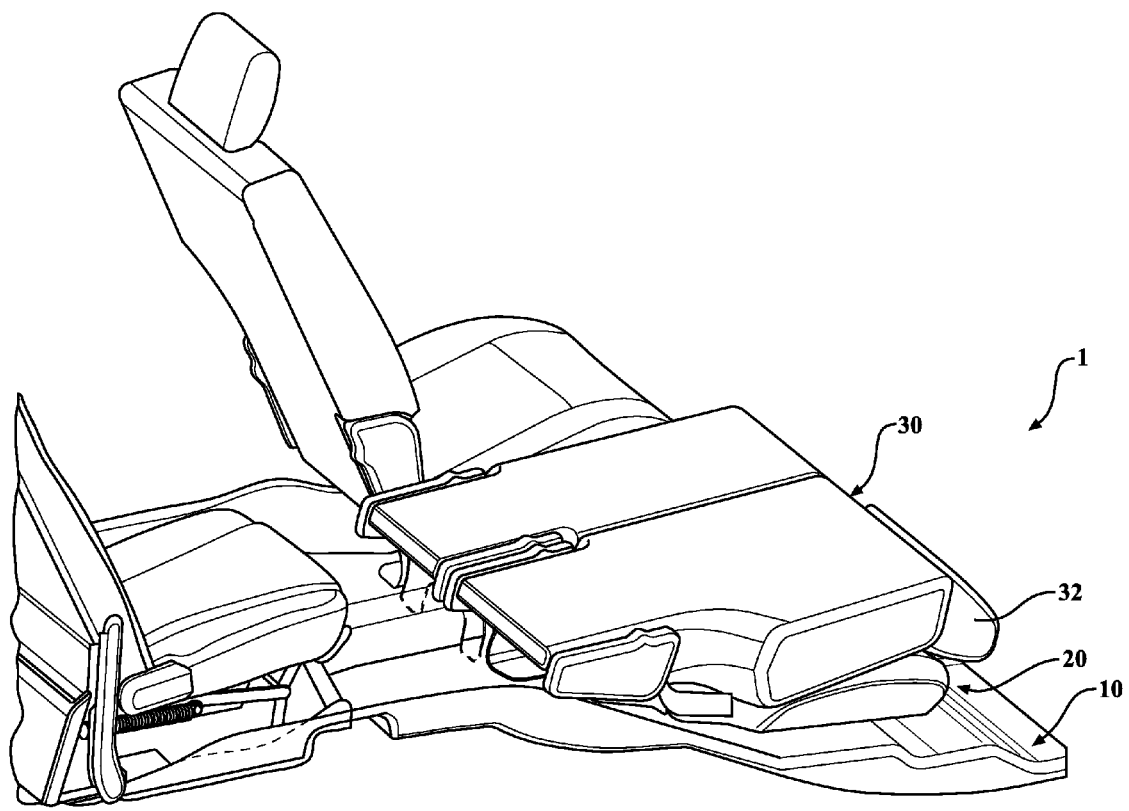
FIG. 19 is a right rear perspective view of the plurality of seat assemblies of FIG. 1, illustrating the right and center seat assemblies in their stowed positions.
Figure 20:
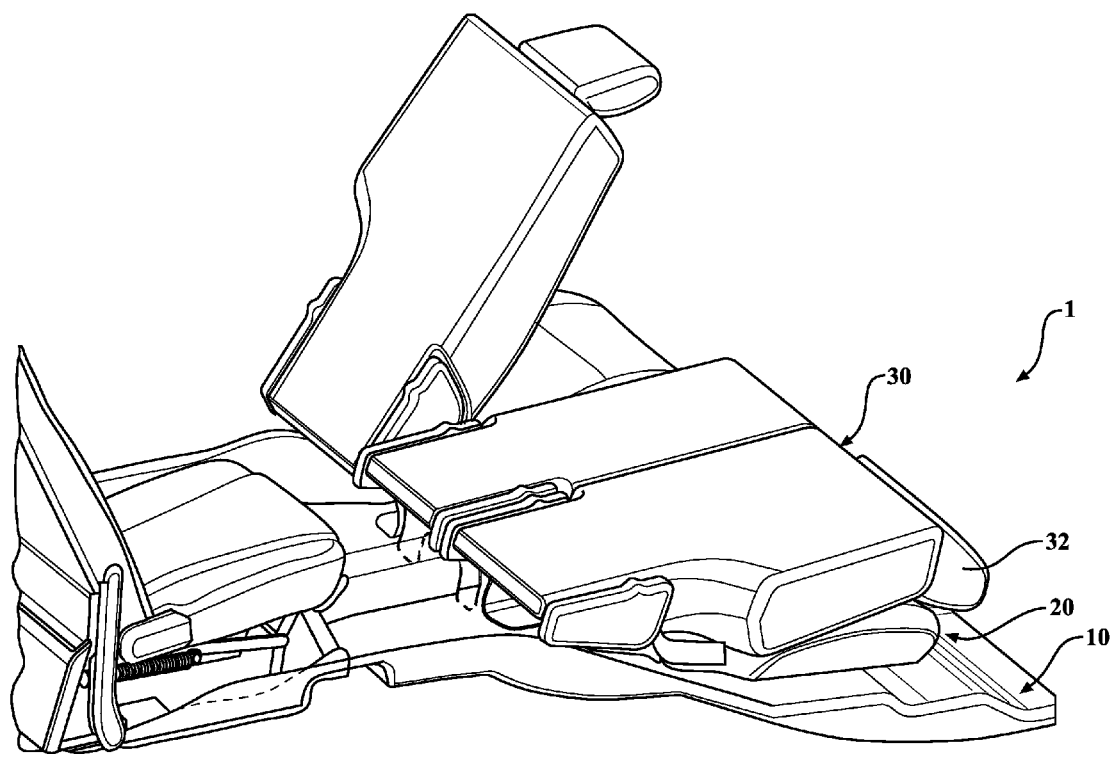
FIG. 20 is a right rear perspective view of the plurality of seat assemblies of FIG. 1, illustrating the left seat assembly being moved or collapsed toward a stowed position.
Figure 21:
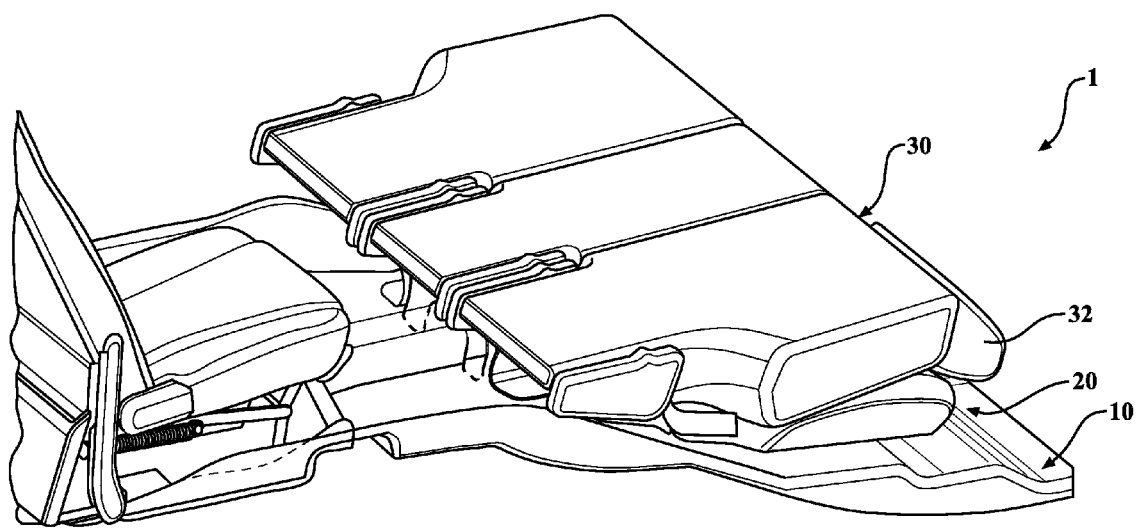
FIG. 21 is a right rear perspective view of the plurality of seat assemblies of FIG. 1, illustrating the left, center, and right seat assemblies in their stowed positions to at least partially define a seating load floor.

All three side-by-side seat assemblies shown in FIG. 15 may be stowed to at least partially define a relatively low seating load floor. For example, as shown in FIGS. 16 and 17, the right seat assembly 1 is moved toward and to a stowed position. As shown in FIGS. 18 and 19, a center seat assembly is moved toward and to a stowed position along side the stowed right seat assembly 1. Finally, as shown in FIGS. 20 and 21, a left seat assembly is moved toward and to a stowed position along side of the stowed right and center seat assemblies. The left and center seat assemblies may be identical or substantially similar to the right seat assembly 1, except that the center seat assembly need not tip forward. Thus, the center seat assembly need not include the corresponding hardware that allows forward tipping of the seat assembly.

FIGS. 22-31 illustrate a second exemplary embodiment of a seat assembly 2 for a motor vehicle having a floor 100. As shown, numeral 100 may designate the floor of the vehicle or a separate bracket that may be coupled to the floor in any suitable manner. In the seat assembly 2, a seat bottom 110 includes a rearward portion detachably coupled to a seat back 120, which may include a head rest (not shown) pivotally coupled thereto. The seat assembly 2 is capable of being moved between a first, deployed position in which a passenger may be seated in the seat assembly 2 (e.g. FIG. 22), and a second, stowed position in which the seat back 120 and the seat bottom 110 are folded down or collapsed to provide a flat load floor for the vehicle (e.g. FIG. 31). In the deployed position, the seat bottom 110 is arranged to be located or locked in any suitable manner relative to the seat back 120 to provide a solid seat structure for a passenger.

The seat bottom 110 is not only pivotable but is also articulatable with respect to the floor 100 of the vehicle. More specifically, the seat bottom 110 includes a forward portion pivotally coupled to a seat bottom end of a seat bottom link 112 to be pivotable about a seat bottom pivot axis 111. Also, the seat bottom link 112 includes a leg end pivotably coupled to an upper end of a seat bottom leg 130 to be pivotable about a seat bottom link pivot axis 113. The seat bottom leg 130 includes a lower end pivotably mountable with respect to the floor 100. In particular, the leg 130 may be pivotally coupled to the floor 100 of the vehicle about a seat bottom leg axis 131. The seat bottom link 112 may be a torsional or spring-loaded bar, which pivotally biases the seat bottom 110 in an upward and forward direction away from the deployed position wherein the seat bottom 110 may move in a generally arched direction towards the front of the vehicle.

Figure 27:
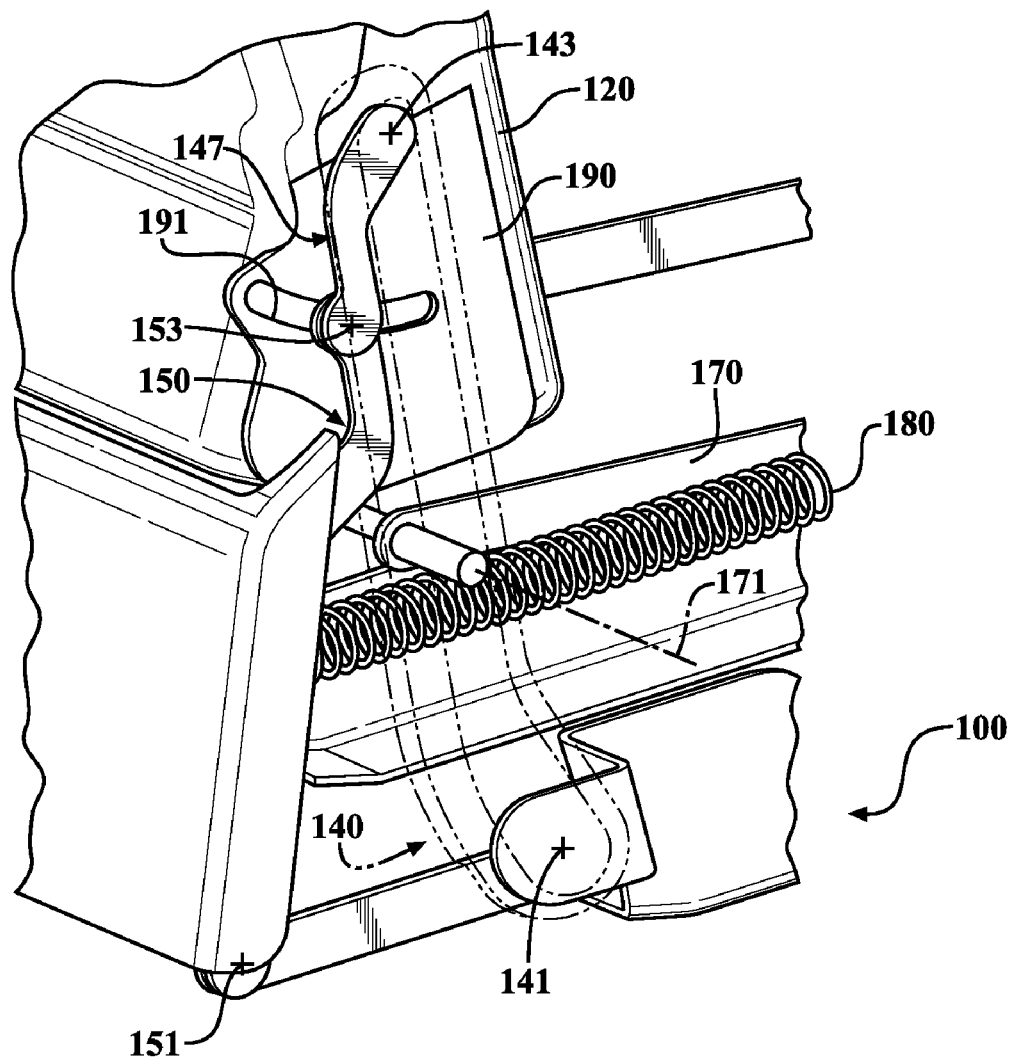
FIG. 27 is an enlarged right side view of the seat assembly of FIG. 26, illustrating a translatable and pivotable hip joint.

Likewise, the seat back 120 is not only pivotable but is also articulatable with respect to the floor 100. More specifically, the seat back 120 may be coupleable to the floor 100 via first and second seat back legs 140, 150. The first seat back leg 140 includes a first lower end pivotably mountable with respect to the floor 100 about a first seat back leg axis 141. The second seat back leg 150 includes a second lower end pivotably mountable with respect to the floor 100 about a second seat back leg axis 151. The first and second lower ends of the pivot legs 140, 150 may be pivotally coupled to the floor 100 by a common bracket 145 that may be fastened or otherwise attached or secureable to the floor 100. Referring to FIG. 27, the first seat back leg 140 includes a first upper end pivotally coupled to a lower portion of the seat back 120 to be pivotable about a first seat back pivot axis 143. The second seat back leg 150 includes a second upper end pivotally coupled to the lower portion of the seat back 120 about a second seat back pivot axis 153, which may be a pivotable and translatable hip axis. For example, a rear link 147 includes a first end pivotally coupled to the first upper end of the first seat back leg 140, and a second end pivotally coupled to the second upper end of the second seat back leg 150 about a second seat back pivot axis 153. The pivot axis 153 is translatable within a slot 191 of a bracket 190 of the lower portion of the seat back 120. The bracket 190 may be fixed relative to the rest of the seat back 120. Thus, the seat back may be pivoted about the pivot axis 153, and translated through the slot 191, which may limit seat back pivoting to the extent of the slot 191, which may be curved as shown.

The seat assembly 2 may also include a seat transmission linkage coupled between the seat bottom leg 130 and one or both of the seat back legs 140, 150. According to the seat transmission linkage, a first transmission link 170 includes a rearward end pivotally coupled about a first transmission pivot axis 171 to the first seat back leg 140 at a location intermediate the upper and lower ends of the first seat back leg 140. A second transmission link 160 includes one end pivotably mountable with respect to the floor 100 of the vehicle about a second transmission pivot axis 161, and another end pivotally coupled to a first end of a third transmission link 164, which is pivotable about a third transmission pivot axis 165. The second link 164 includes another end that is pivotally coupled to the upper end of the seat bottom leg 130 about a fourth transmission pivot axis 167 that may be the same or coaxial with the seat bottom link pivot axis 113. A forward end of the first transmission link 170 is pivotally coupled to the coupled ends of the first and second links 160, 164 to be pivotable about the third transmission pivot axis 165. Finally, a biasing member 180 includes a first end coupled to the first transmission link 170 at a location intermediate the forward and rearward ends of the link 170, and a second end coupled to the second seat back leg 150 at a location intermediate the upper and lower ends of the second seat back leg 150.

Figure 22:
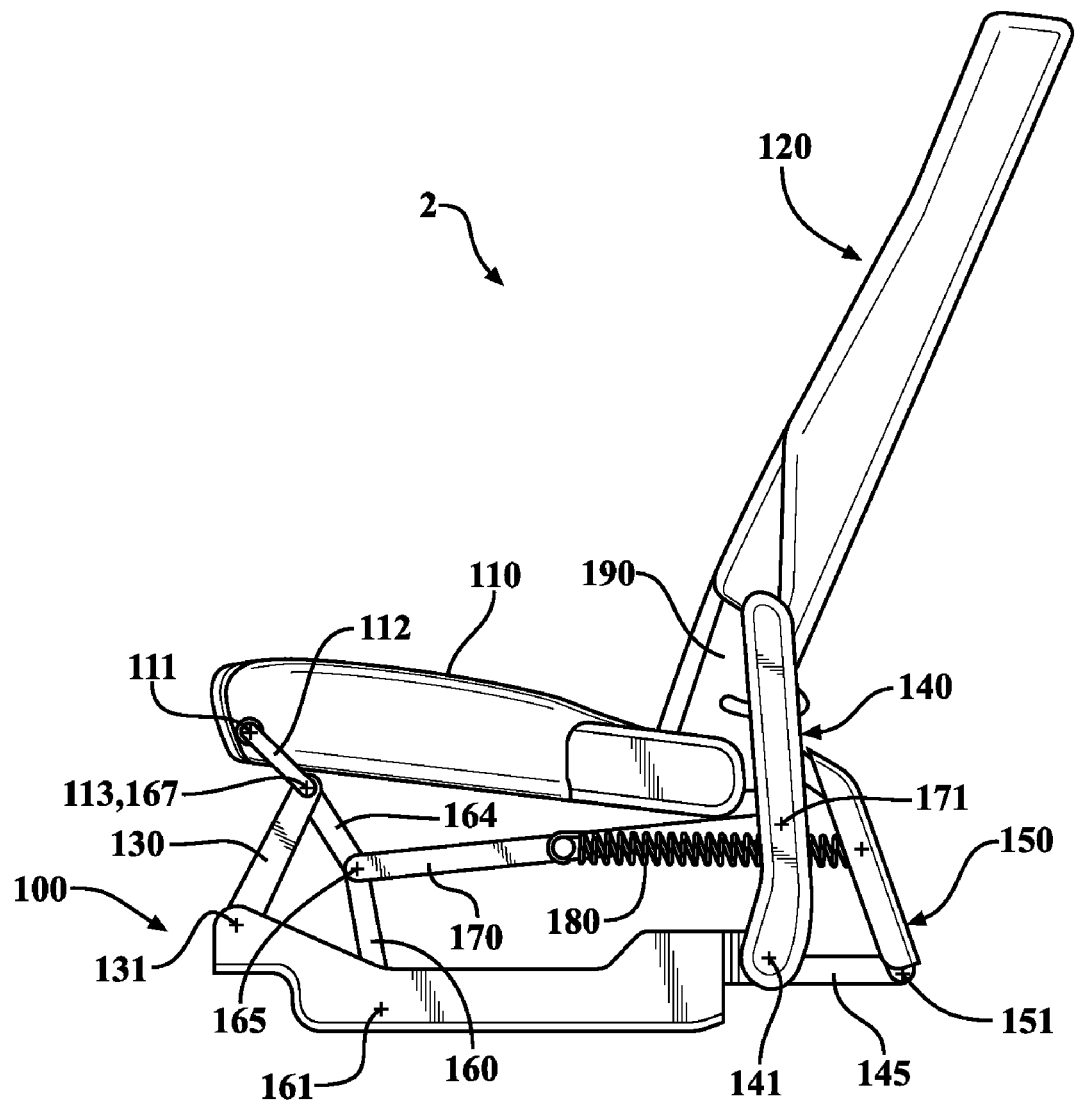
FIG. 22 is a left side view of a second exemplary embodiment of a seat assembly for a vehicle.
Figure 23:
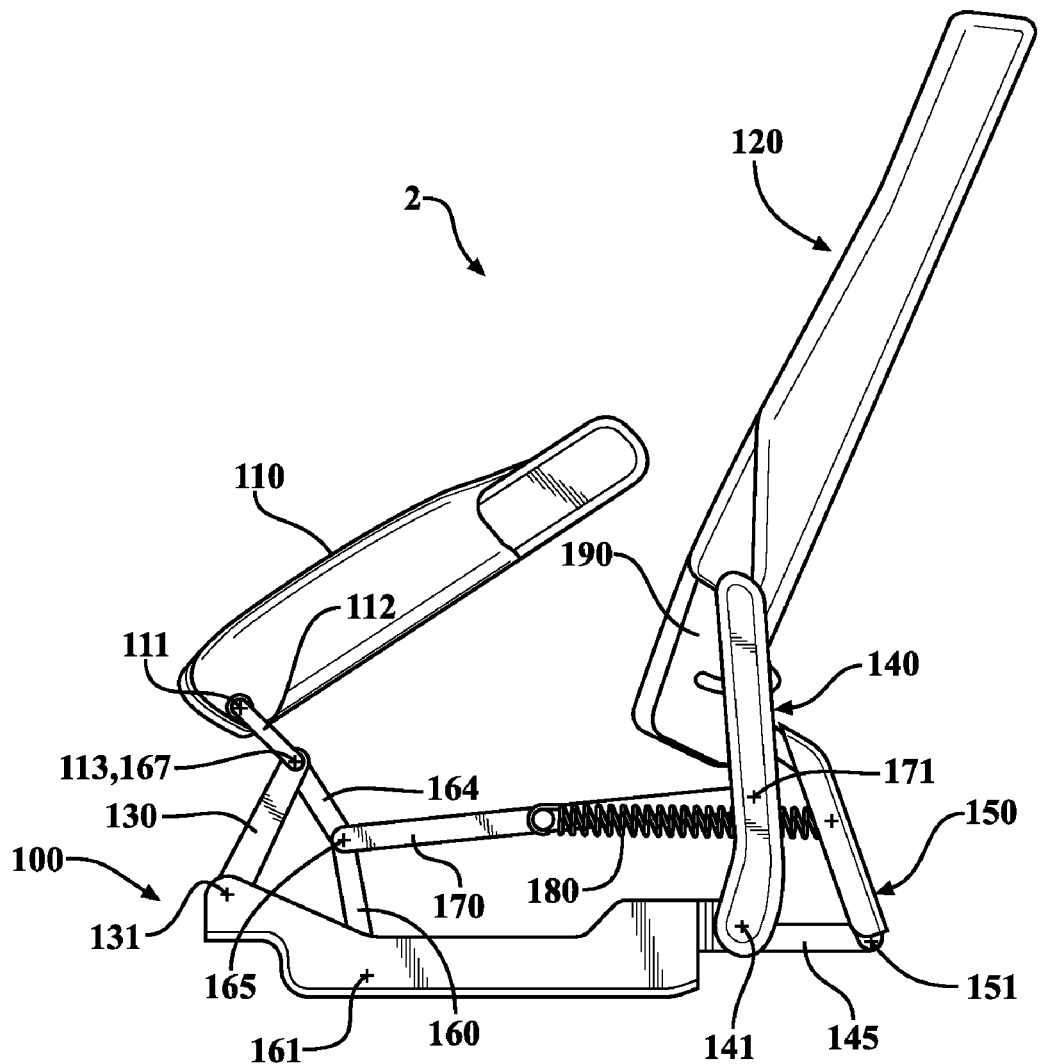
FIG. 23 is a left side view of the seat assembly of FIG. 22, illustrating a seat bottom of the seat assembly being pivoted forward toward a generally upright position.
Figure 31:
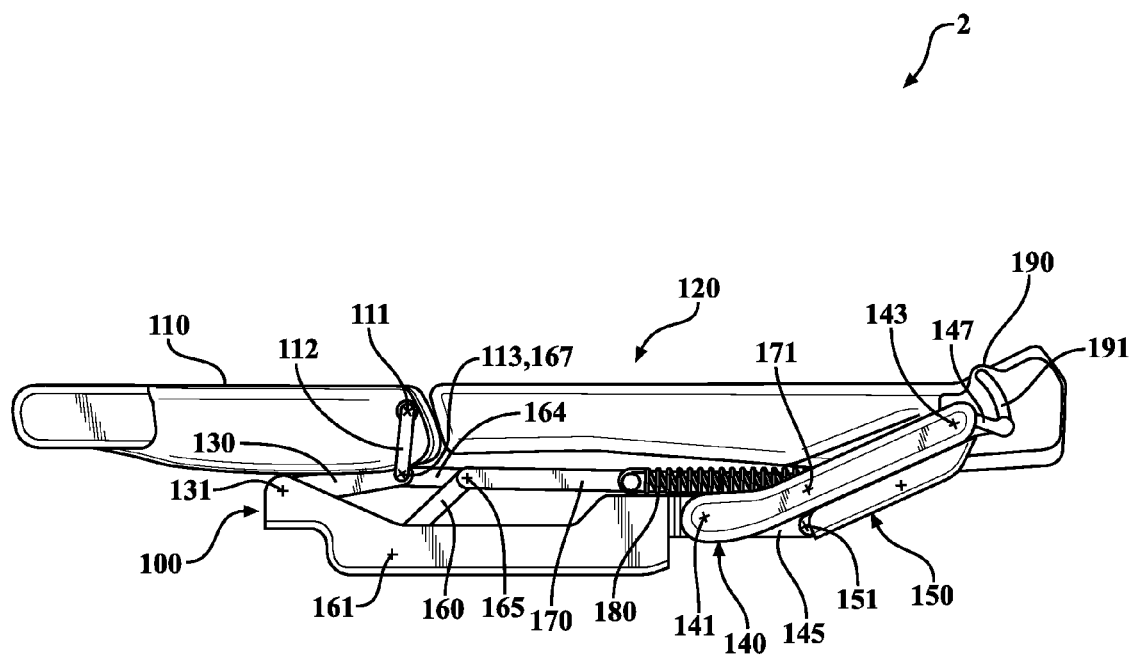
FIG. 31 is a left side view of the seat assembly of FIG. 29, illustrating the seat bottom and seat back in their stowed positions to define at least a portion of a seating load floor.
Figure 32:
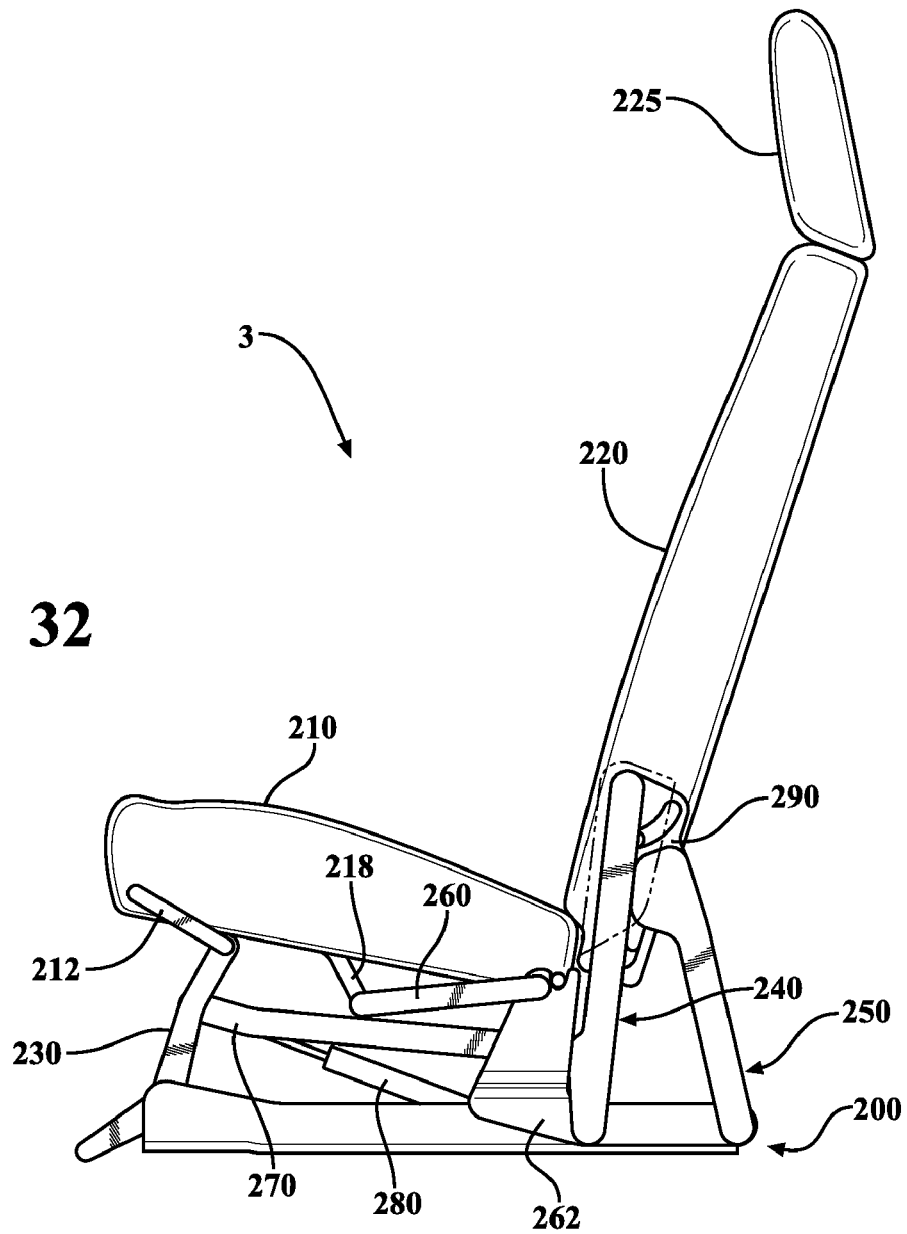
FIG. 32 is a left side view of a third exemplary embodiment of a seat assembly for a vehicle.

Referring to FIGS. 22 and 23, when the seat assembly 2 is moved out of the deployed position and toward the stowed position of FIG. 31, the seat bottom 110 is first dislocated or unlocked with respect to the seat back 120 in any suitable manner to permit the seat bottom 110 and the seat back 120 to move independently of one another. For example, the seat bottom 120 and/or seat back 120 may be unlatched from their deployed positions shown in FIG. 22 and pivoted or articulated forward in any suitable manner, such as by pulling on a rear mounted strap or lifting a side mounted lever that may be coupled to a seat latching and unlatching mechanism (not shown).

Figure 24:
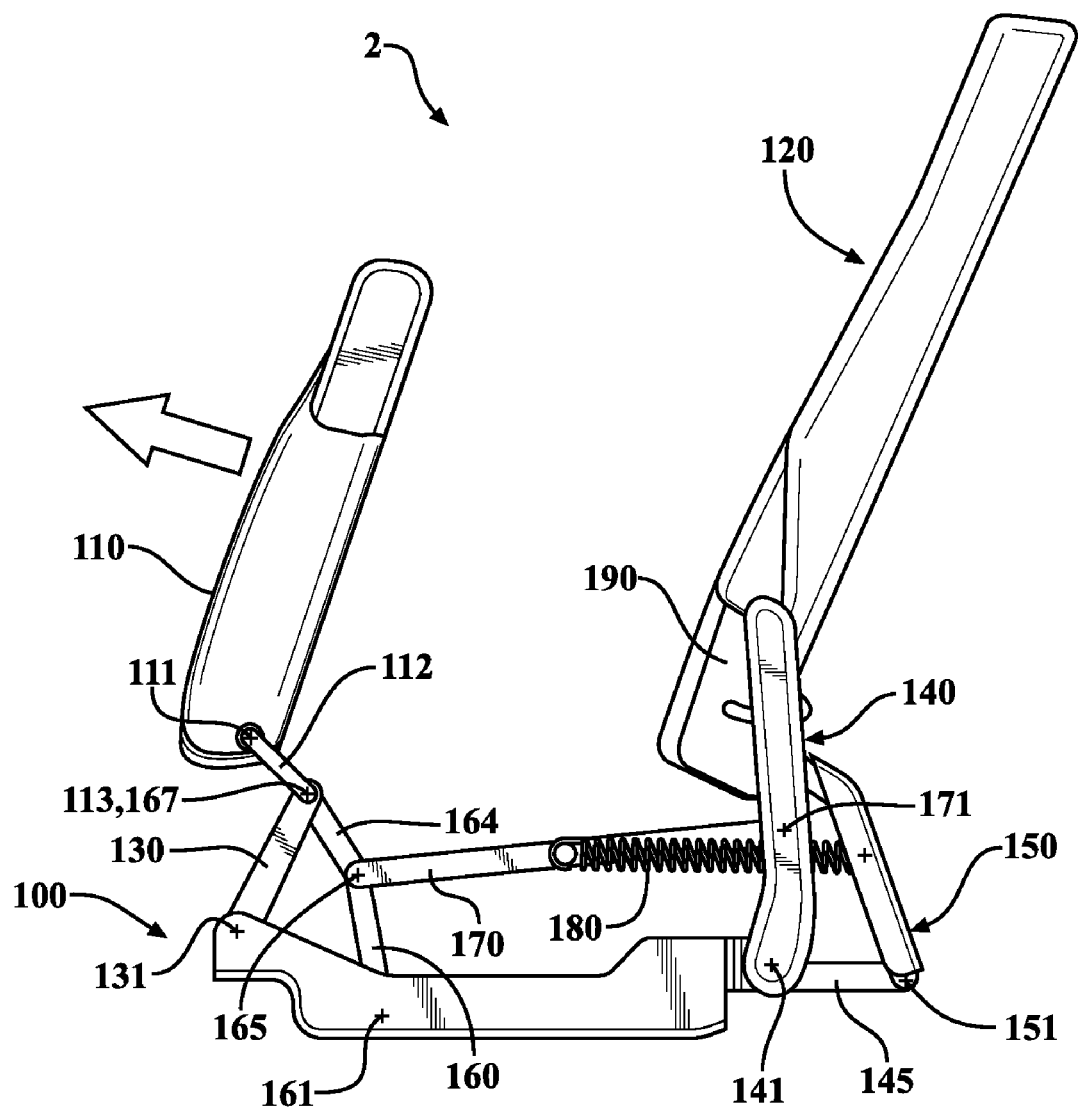
FIG. 24 is a left side view of the seat assembly of FIG. 23, illustrating the seat bottom being further pivoted toward the generally upright position.
Figure 25:
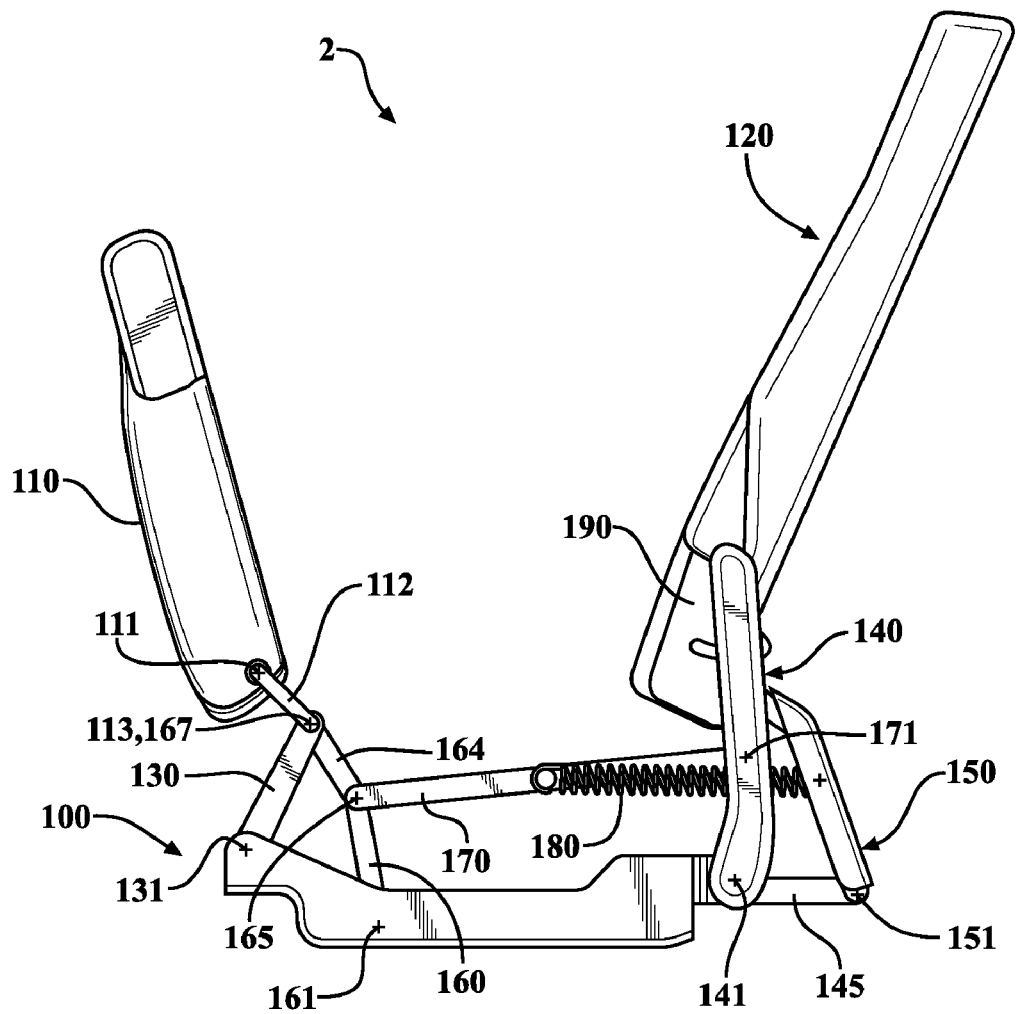
FIG. 25 is a left side view of the seat assembly of FIG. 24, illustrating the seat bottom in the generally upright position.

Referring to FIGS. 23-25, the seat bottom 110 continues to pivot or articulate forward in the direction of the front of the vehicle. For example, the torsional link 112 may pivotably bias the seat bottom 110 to pivot the seat bottom about the seat bottom pivot axis 111 and/or about the seat bottom link pivot axis 113. The link 112 and/or the seat bottom leg 130 may hold the seat bottom 110 in a detent position, as shown in FIG. 25, near the back of a seat back (not shown) located directly in front of the seat assembly 2.

Figure 26:
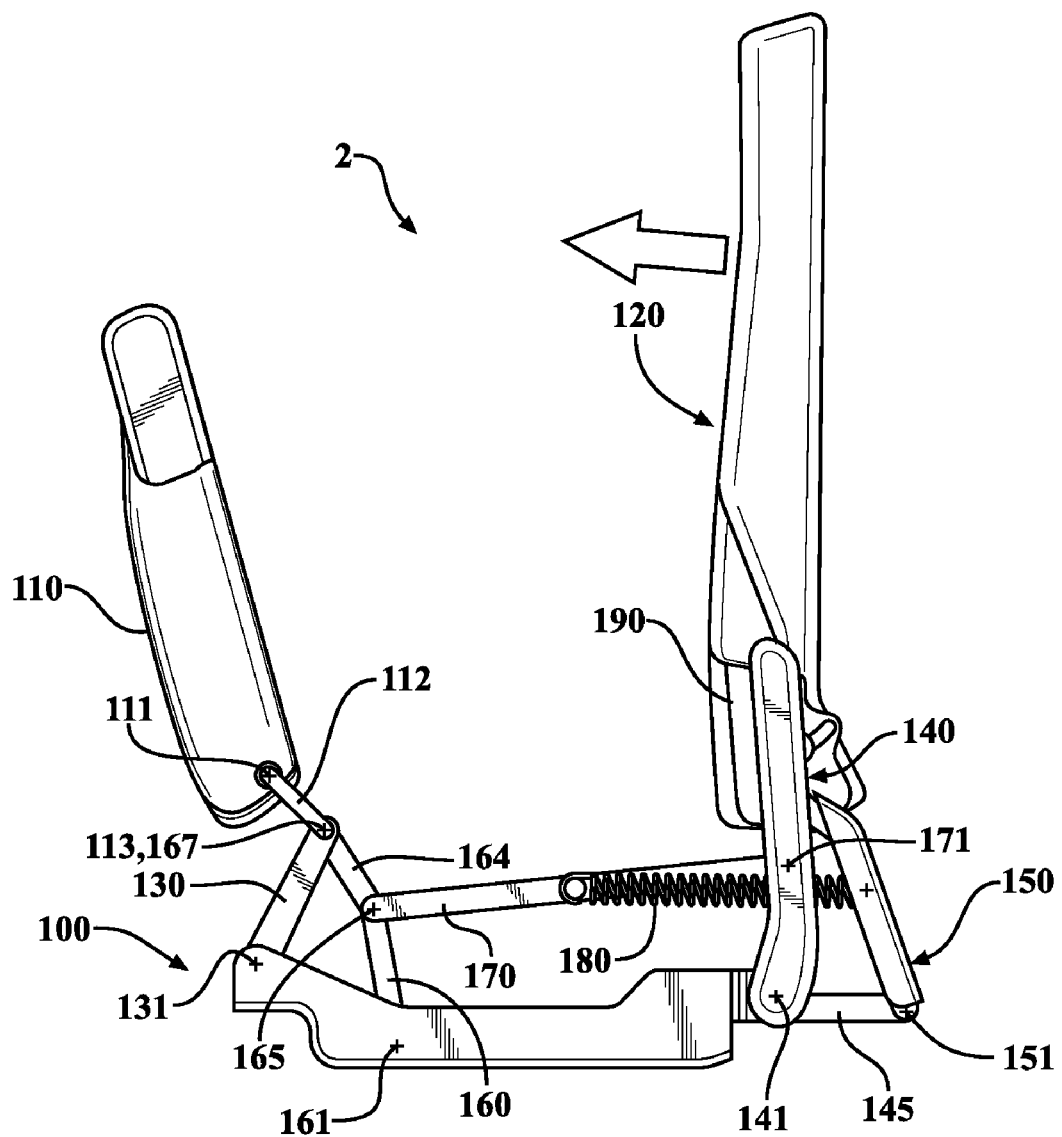
FIG. 26 is a left side view of the seat assembly of FIG. 25, illustrating a seat back of the seat assembly being moved or collapsed toward a stowed position.

Referring to FIGS. 25 and 26, once the seat bottom 110 reaches the detent position, the seat back 120 may articulate in a forward and downward direction. Pivoting of the seat back 120 about the first seat back pivot axis 143 from FIG. 25 to FIG. 26 may be limited by the extent of the slot 191 of the seat back bracket 190 (shown in FIG. 27). As the seat back 120 articulates forward and downward, the seat transmission linkage 160, 164, 170 begins to collapse downward and toward the rear of the vehicle. The seat bottom 110 simultaneously articulates or otherwise moves in a rearward direction as a result of the downward and rearward collapse of the linkage 160, 164, 170.

Figure 28:
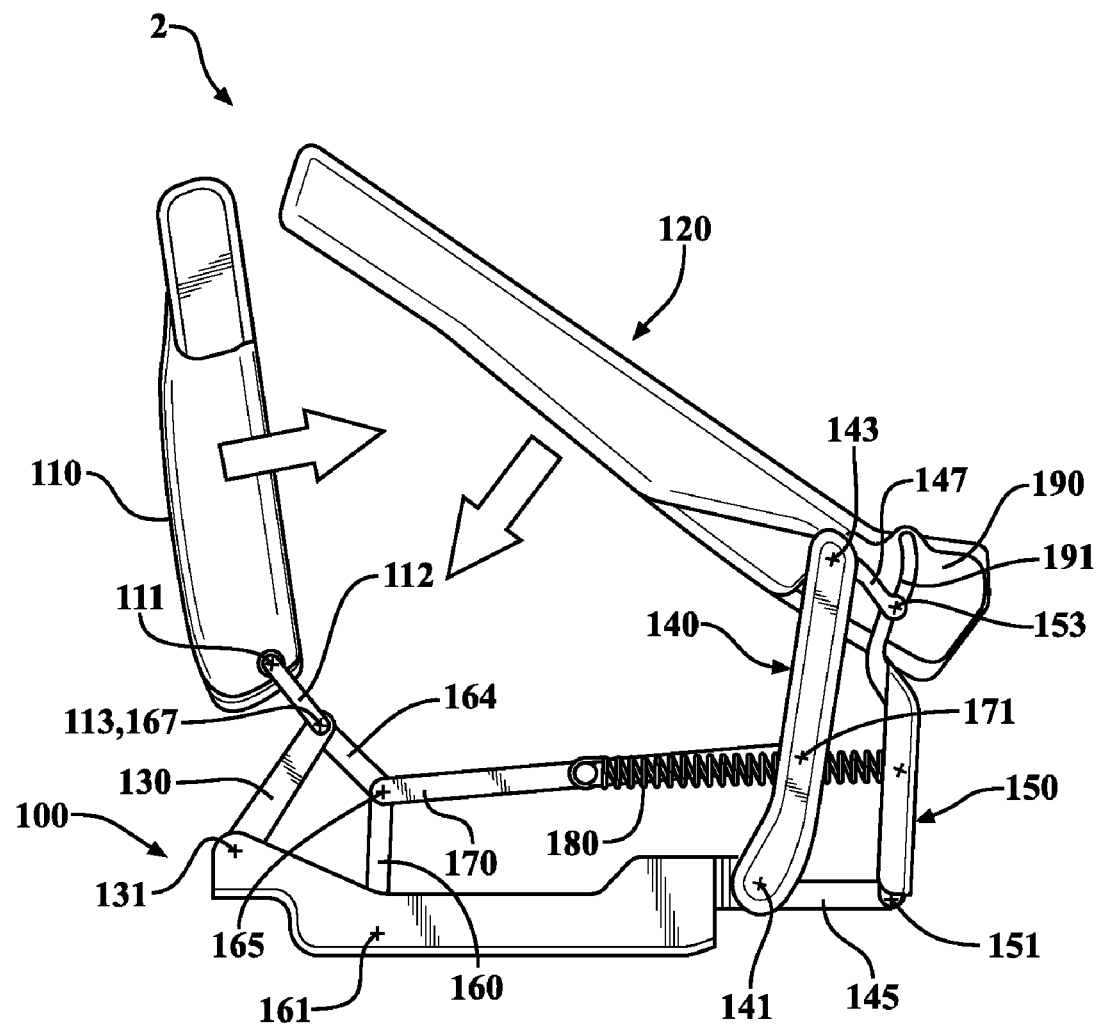
FIG. 28 is a left side view of the seat assembly of FIG. 26, illustrating the seat bottom being pulled rearwardly by further pivoting of the seat back toward the stowed position.

Referring to FIG. 28, as the seat back 120 continues forward and downward articulation, the motion of the seat back 120 and leg 140 pulls the linkage 160, 164, 170 rearwardly, thereby pulling the seat bottom leg 130 and displacing the seat bottom 110 rearwardly toward the upper end of the moving seat back 120.

Figure 29:
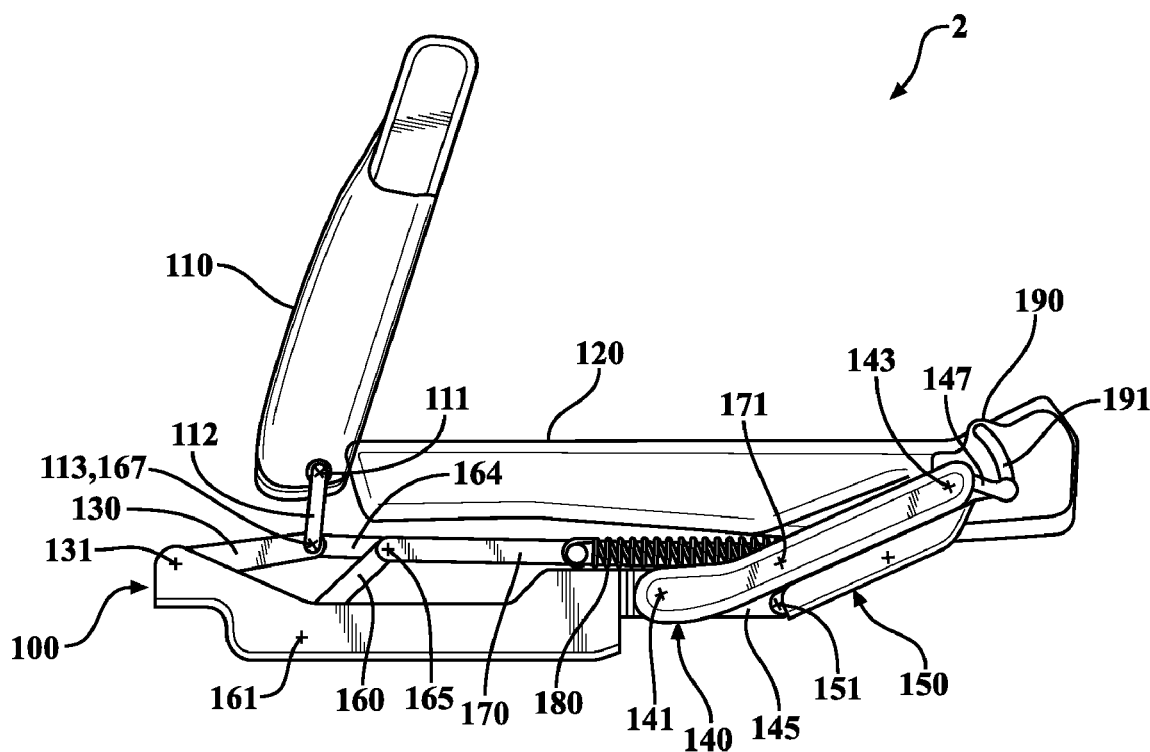
FIG. 29 is a left side view of the seat assembly of FIG. 28, illustrating the seat bottom pulled further rearwardly by continued pivoting of the seat back to the stowed position.
Figure 30:
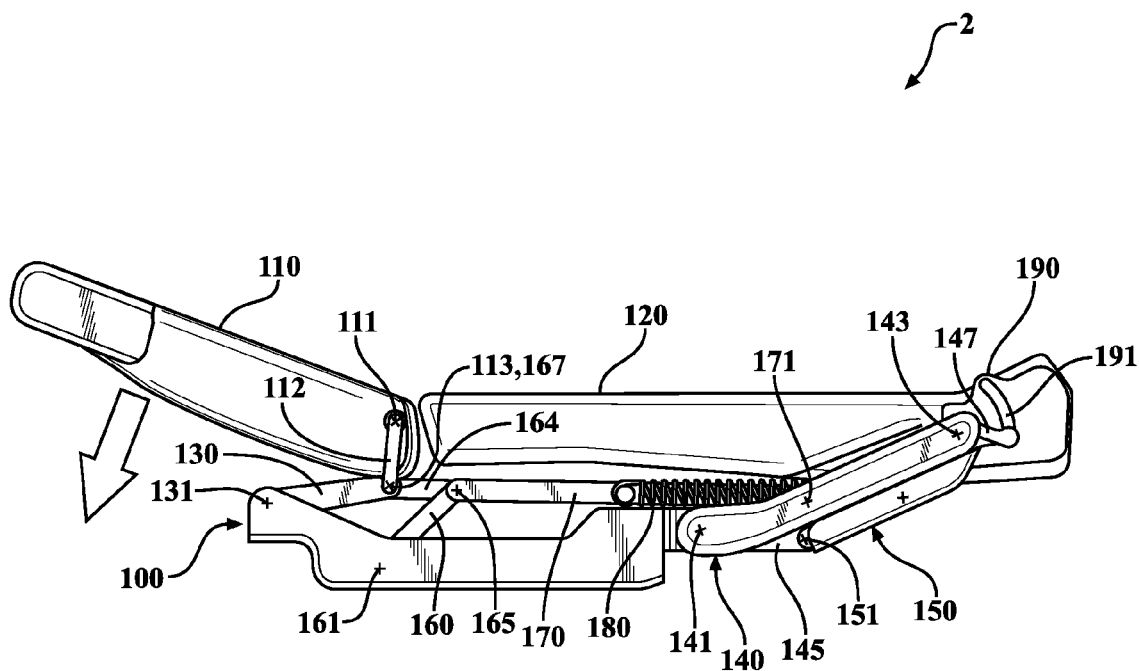
FIG. 30 is a left side view of the seat assembly of FIG. 29, illustrating the seat bottom being moved or collapsed toward a stowed position while the seat back remains in its stowed position.

Referring to FIGS. 29 and 30, as the seat back 120 finishes its forward and downward articulation, the upper portion of the seat back 120 may impinge on the underside of the seat bottom 110 to bias the seat bottom 110 in a forward and downward direction such that the seat bottom 110 may pivot about the seat bottom pivot axis 111 and/or the link 112 may pivot about the link pivot axis 113. Additionally, or instead, the seat bottom link 112 may apply a torque to the seat bottom 110 to rotatably bias the seat bottom 110 in the forward and downward direction until the seat bottom 110 rests against the vehicle floor 100 as shown in FIG. 31.

In this manner, and referring to FIG. 31, the seat bottom 110 and the seat back 120 have been moved against the floor 100 of the vehicle to a stowed position to at least partially define a seating load floor. In other words, the seat back 120 and seat bottom 110 are collapsed into the stowed position wherein the seat bottom 110 and seat back 120 are generally parallel with and resting on the floor 100 of the vehicle while the underside of the seat bottom 110 and the rear of the seat back 120 are facing upwards to at least partially define the seating load floor. Accordingly, passenger seating surfaces of the seat assembly 2 face down against the floor 100 and, thus, are protected from exposure to cargo. Accordingly, there is no need for flip over protective panels to protect such seating surfaces.

Figure 45:
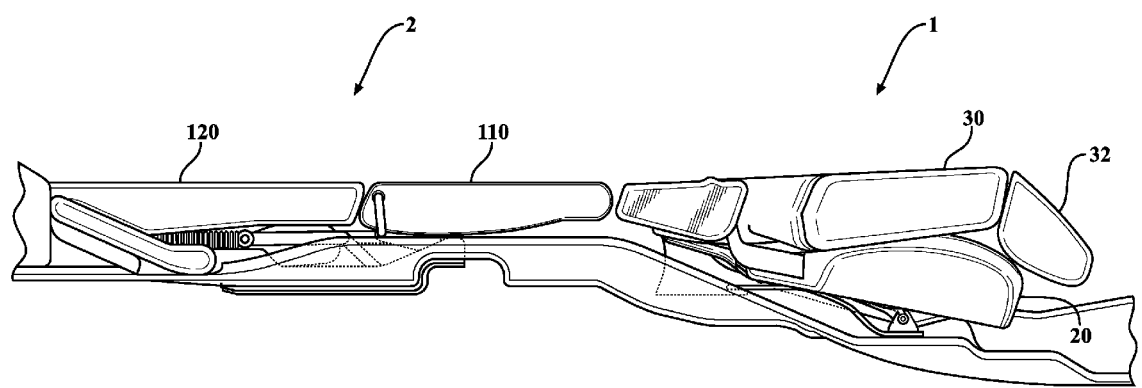
FIG. 45 is a right side view of the stowed second row seat assembly of FIG. 8 and the stowed third row seat assembly of FIG. 31 to at least partially define a combined second and third row seating load floor.

FIG. 45 illustrates the stowed second row seat assembly of FIG. 8 and the stowed third row seat assembly of FIG. 31 to at least partially define a combined second and third row seating load floor.

Finally, FIGS. 32-44 illustrate a third exemplary embodiment of a seat assembly 3 for a motor vehicle having a floor 200. In the seat assembly 3, a rearward portion of a seat bottom 210 may be detachably coupled near or to a lower portion of a seat back 220. A head rest 225 may be pivotally coupled to the seat back 220 in any suitable manner. The seat assembly 3 is capable of being pivoted between a first, deployed position in which a passenger may be seated in the seat assembly 3 and a second, stowed position in which the seat back 220 and the seat bottom 210 are folded down or collapsed to provide a flat load floor for the vehicle.

Figure 34:
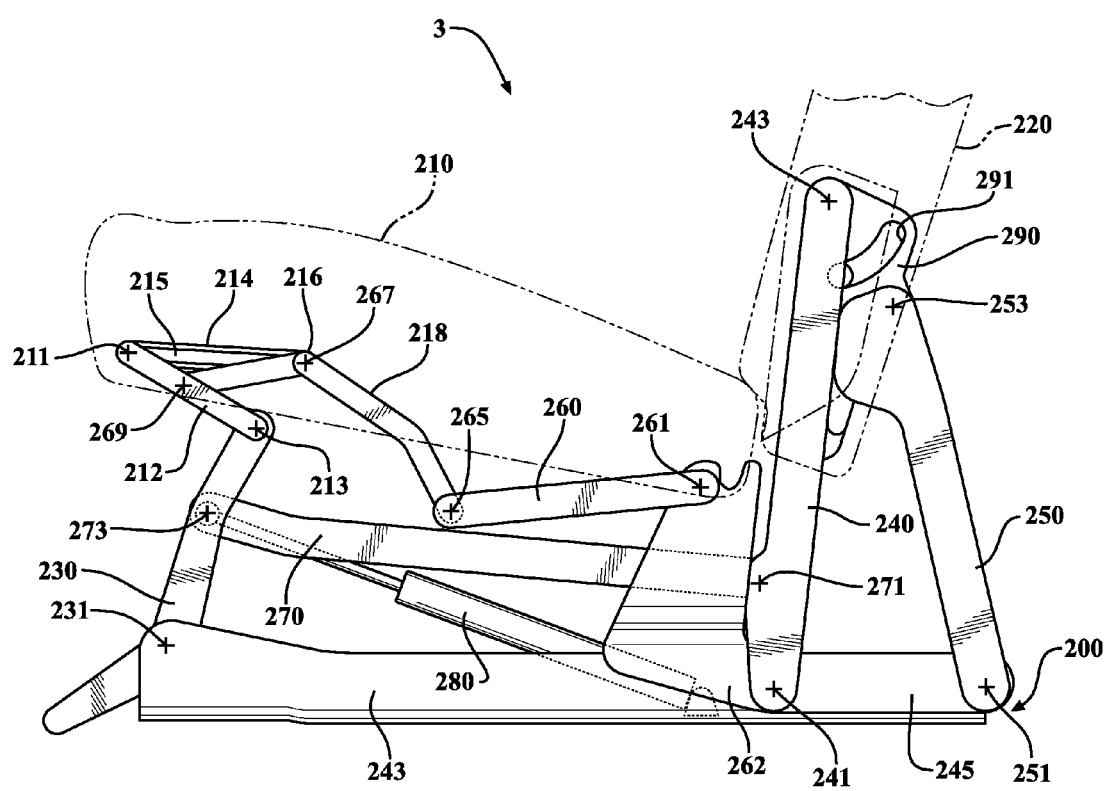
FIG. 34 is an enlarged left side view of the seat assembly of FIG. 32.
Figure 35:
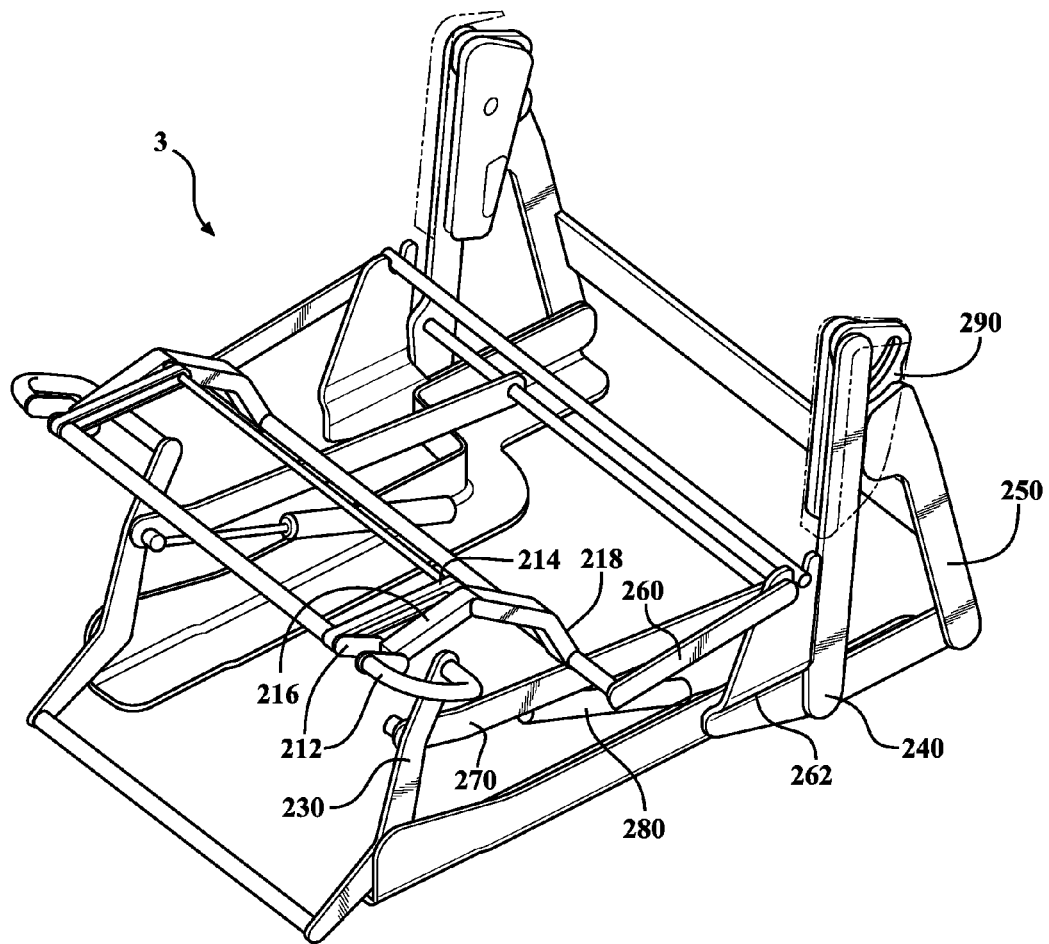
FIG. 35 is a left front perspective view of a portion of the seat assembly of FIG. 32.
Figure 36:
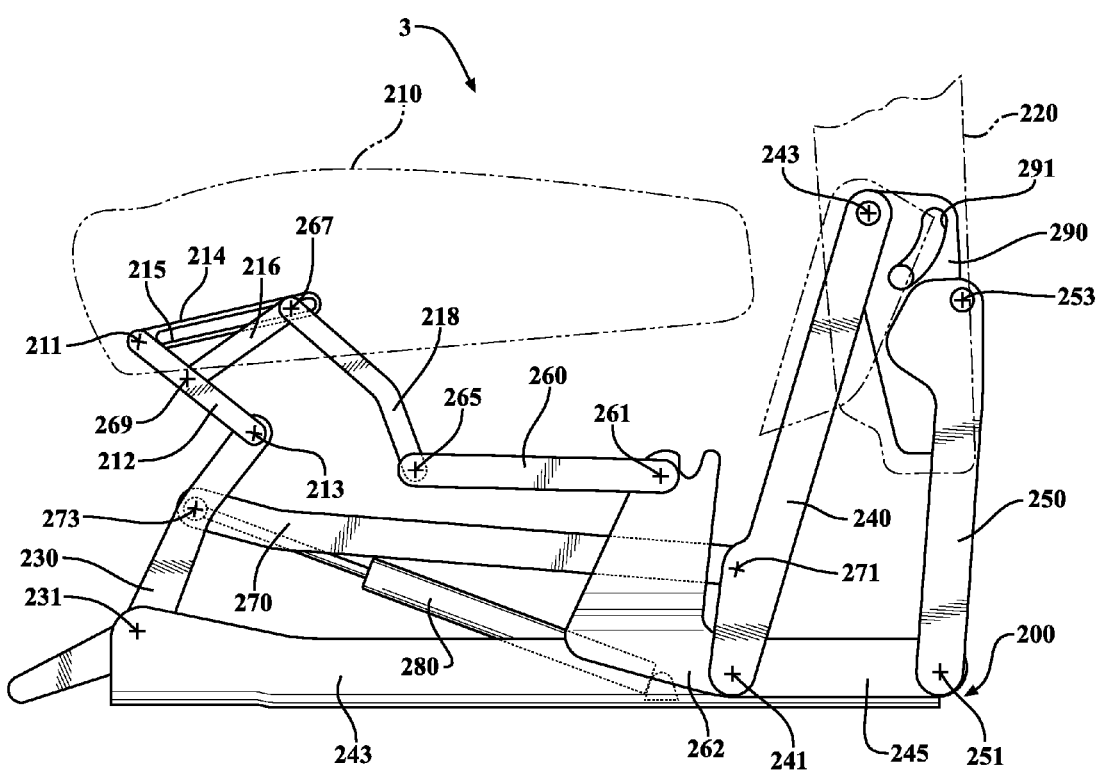
FIG. 36 is an enlarged left side view of the seat assembly of FIG. 32, illustrating a seat back being moved or collapsed toward a stowed position, and a seat bottom being moved or collapsed toward a stowed position.
Figure 37:
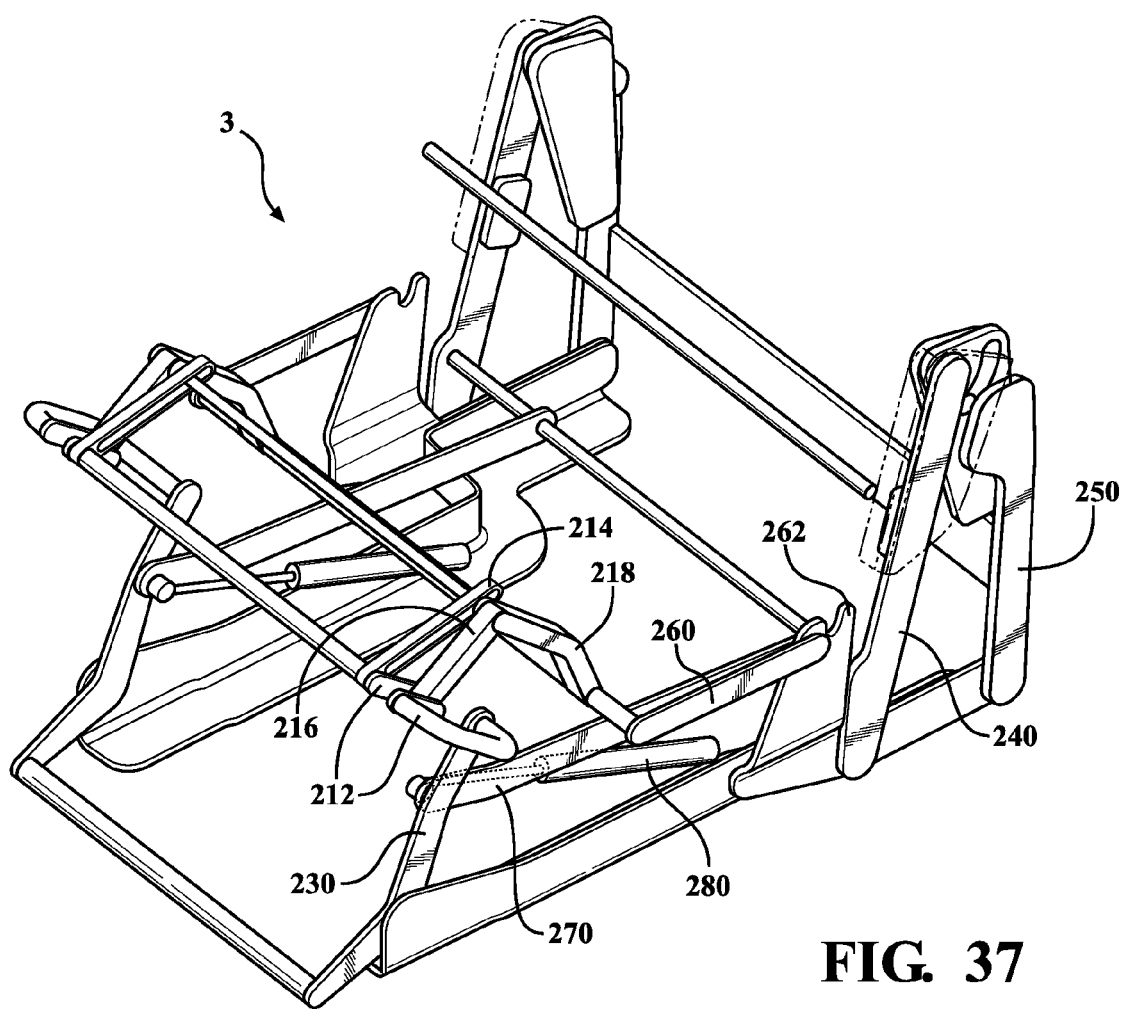
FIG. 37 is a left front perspective view of a portion of the seat assembly of FIG. 36.
Figure 38:
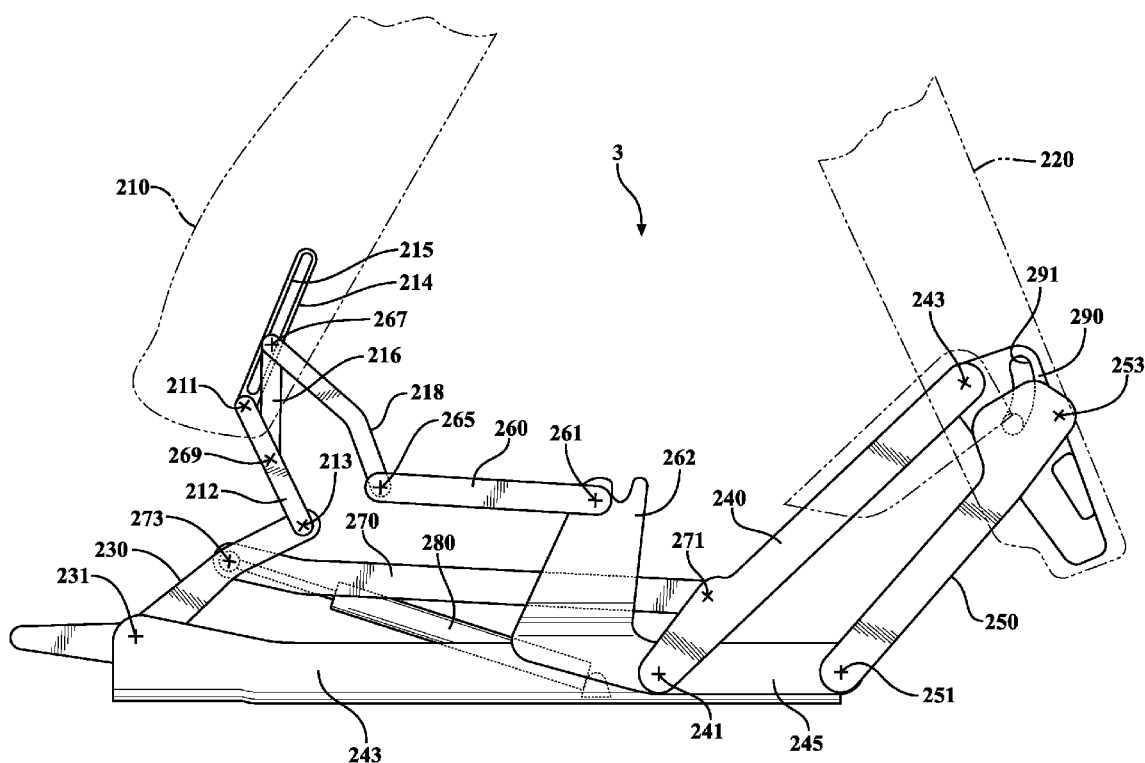
FIG. 38 is a left side view of the seat assembly of FIG. 36, illustrating the seat back being articulated toward its stowed position, and the seat bottom being further articulated toward its stowed position.
Figure 39:
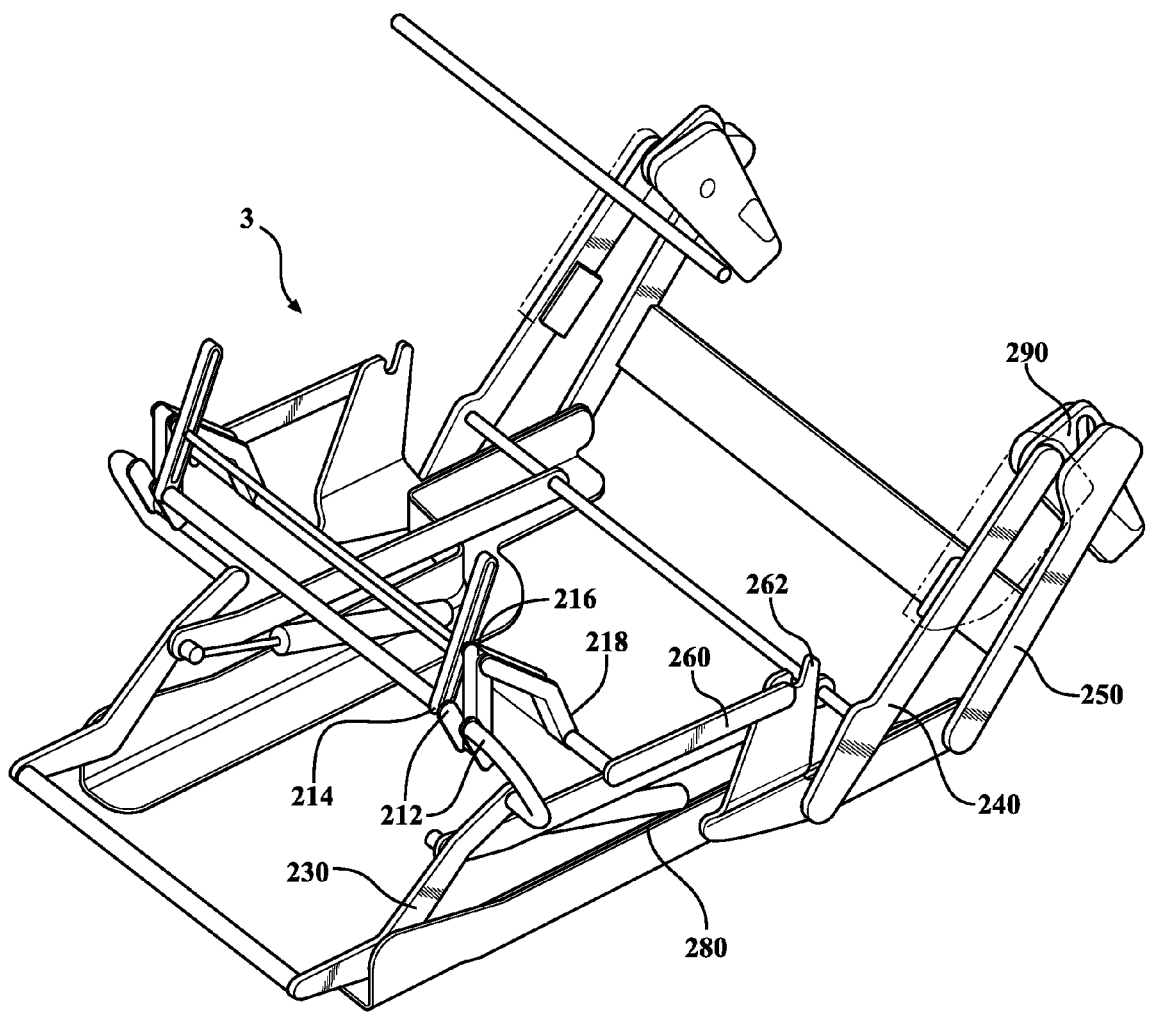
FIG. 39 is a left front perspective view of a portion of the seat assembly of FIG. 38.

Referring to FIG. 34, the seat bottom 210 is not only pivotable but is also articulatable with respect to the floor 200 of the vehicle. More specifically, the seat bottom 210 includes a forward portion pivotally coupled to a seat bottom end of a seat bottom link 212 to be pivotable about a seat bottom pivot axis 211. Also, the seat bottom link 212 includes a leg end pivotably coupled to an upper end of a seat bottom leg 230 to be pivotable about a seat bottom link pivot axis 213. The seat bottom leg 230 includes a lower end pivotably mountable with respect to the floor 200. In particular, the leg 230 may be pivotally coupled to the floor 200 of the vehicle about a seat bottom leg axis 231 via a bracket 243. The seat bottom link 212 may be a torsional or spring-loaded bar, which pivotally biases the seat bottom 210 in an upward and forward direction away from the deployed position wherein the seat bottom 210 pivots in a generally arched direction towards the front of the vehicle. In the deployed position, the seat bottom 210 is arranged to be located against or locked with respect to the seat back 220 in any suitable manner to provide a solid seat structure for a passenger.

Additionally, the forward portion of the seat bottom 210 may be articulatably coupleable relative to the floor 200 by a torsional or spring-loaded linkage 212, 214, 216, 218, 260 which may bias the seat bottom 210 in an upward direction away from the deployed position wherein the seat bottom 210 moves forward in a generally arched direction towards the front of the vehicle. According to the linkage, a first link 260 includes one end pivotably mountable with respect to the floor 200 about a first link pivot axis 261, and another end pivotally coupled to a first end of a second link 218, which is pivotable about a second link pivot axis 265. The first link 260 may be pivotally coupled to a bracket 262 that may be fastened or otherwise secured to the vehicle floor 200. A third link 214 includes a first end coupled to the second end of the second link 218 and including a slot 215 to be translatable with respect to a third link pivot axis 267, and a second end pivotally coupled to the seat bottom end of the at least one seat bottom link 212 to be pivotable about the seat bottom pivot axis 211. A fourth link 216 includes a first end pivotally coupled to the first end of the second link 218 to be pivotable about the third link pivot axis 267, and a second end pivotally coupled to the at least one seat bottom link 212 to be pivotable about a fourth link pivot axis 269 offset from the seat bottom pivot axis 211.

Still referring to FIG. 34, the seat back 220 is not only pivotable but is also articulatable with respect to the floor 200. More specifically, the seat back 220 may be coupleable to the floor 200 via first and second seat back legs 240, 250. The first seat back leg 240 includes a first lower end pivotally mountable with respect to the floor 200 about a first seat back leg axis 241. The second seat back leg 250 includes a second lower end pivotably mountable with respect to the floor 200 about a second seat back leg axis 251. The first and second lower ends of the pivot legs 240, 250 may be pivotally coupled to the floor 200 by a common bracket 245, which may be fastened or otherwise attached or secureable to the floor 200 and may be the same as bracket 243. The first seat back leg 240 includes a first upper end pivotally coupled to a lower portion of the seat back 220 to be pivotable about a first seat back pivot axis 243, and the second seat back leg 250 includes a second upper end pivotally coupled to the lower portion of the seat back 220 about a second seat back pivot axis 253.

An articulatable hip joint may be provided laterally between the lower portion of the seat back 220 and the upper ends of the legs 240, 250, and vertically and longitudinally between the first and second seat back pivot axes 243, 253. For example, the joint may include a rearward pivot link 290 that is pivotally coupled to the first upper end of the first seat back leg 240 to be pivotable about the first seat back pivot axis 243, pivotally coupled to the second upper end of the second seat back leg 250 to be pivotable about the second seat back pivot axis 253, and translatably coupled to the lower portion of the seat back 220.

Figure 33:
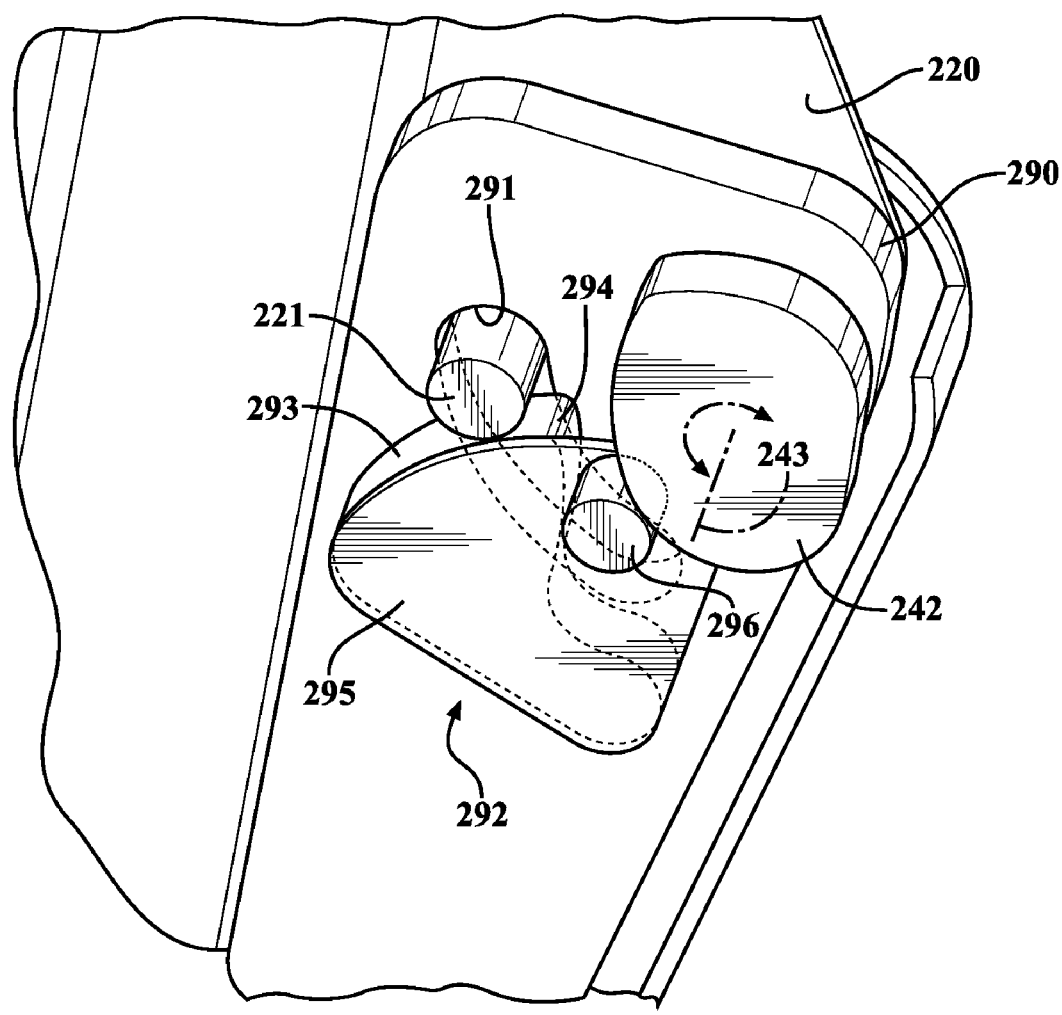
FIG. 33 is an enlarged right side view of a detent mechanism of the seat assembly of FIG. 32.

Referring to FIG. 33, an automatic seat back latching and unlatching mechanism may prevent folding movement of the seat back 220 from interfering with folding movement of the seat bottom 210. A rearward pivot link 290 includes a slot 291 in which one end of a seat back pin 221 is received. An opposite end of the seat back pin 221 is coupled to the seat back 220 in any suitable manner. For example, the seat back pin 221 may be fastened, welded, or otherwise attached to the seat back 220. The mechanism may also include a cam 242, which may be coupled to the second upper end of the second seat back leg 240 and may be pivotable about the second seat back pivot axis 243. The mechanism may also include a detent mechanism 292 that may be carried by the rear pivot link 290 to temporarily maintain the seat back pin 221 in its detent position in the slot 291.

More specifically, the detent mechanism 292 may prevent the seat back 220 from pivoting about the seat back pivot axis 243 before the seat bottom 220 has flipped out of the path of the seat back 210. The detent mechanism 292 may include a pawl 293 pivotally coupled to the rear pivot link 290 and having a lobe 294 to maintain the seat back pin 221 in its detent position shown in FIG. 33. The pawl 293 may be biased to the detent position shown in FIG. 33 by any suitable biasing mechanism such as a spring (not shown). The detent mechanism 292 may also include a plate 295 fixed to pawl 293 in any suitable manner and a cam roller 296 coupled to the plate 295 in any suitable manner for cooperation with the cam 242.

Figure 44:
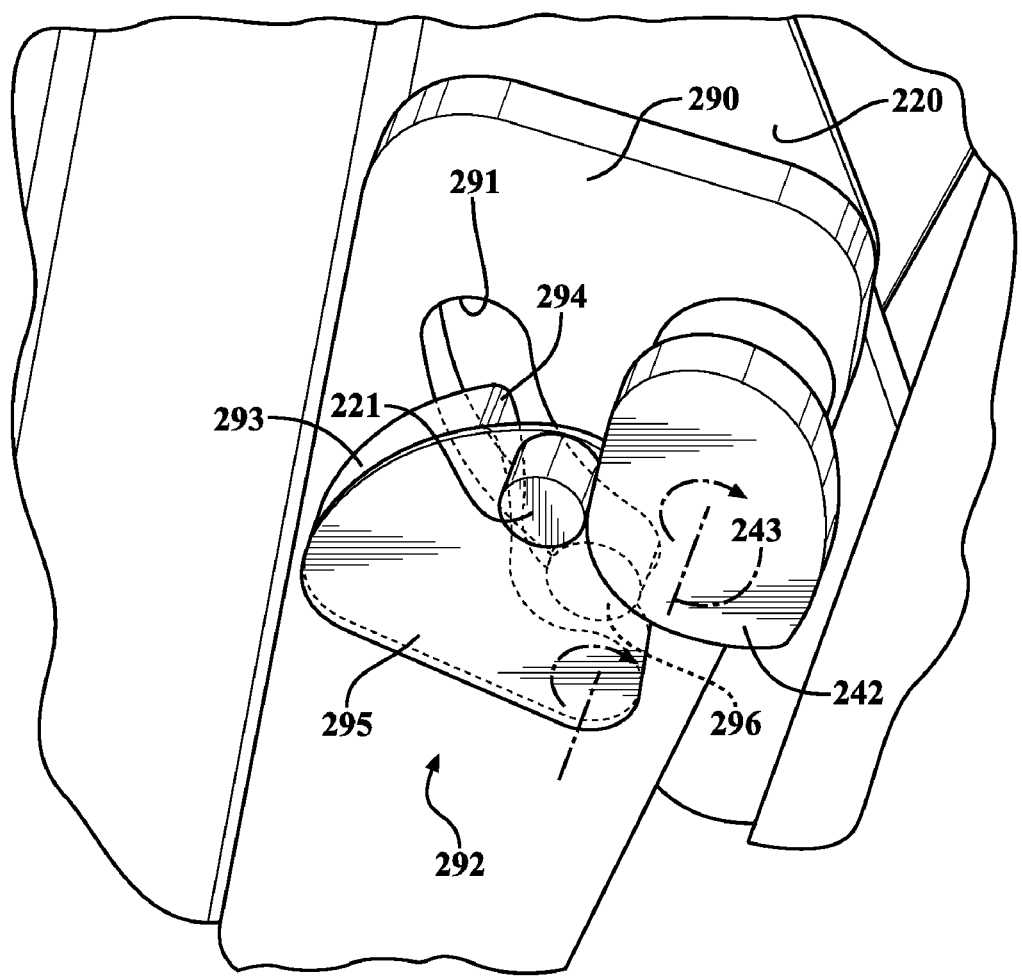
FIG. 44 is another view of the detent mechanism of FIG. 33.

In operation of the latching and unlatching mechanism, and referring to FIG. 33, the cam 242 may rotate into contact with the cam roller 296 to, in turn, rotatably displace the pawl 293 out of its detent position to allow the seat back pin 221 and seat back 220 to move. Referring now to FIG. 44, movement of the seat back 220 from its stowed position toward its deployed position causes the seat back pin 221 to move from its stowed position of FIG. 44 back toward its detent position of FIG. 33. Once the seat back pin 221 reaches its detent position of FIG. 33, the cam 293 may automatically return to its detent position in front of the seat back pin 221 to maintain the seat back in position until the detent mechanism 292 is released once again.

The seat assembly 3 may also include a seat transmission linkage coupled between the seat bottom leg 230 and one or both of the seat back legs 240, 250 and/or the bracket(s) 243, 245. According to the seat transmission linkage, a link 270 having a first end is pivotally coupled to the first seat back leg 240 at a location intermediate the upper and lower ends of the second seat back leg 250 to be pivotable about a first transmission pivot axis 271, and a second end pivotally coupled to the at least one seat bottom leg 230 at a location intermediate the upper and lower ends of the at least one seat bottom leg 230 to be pivotable about a second transmission pivot axis pivot axis 237. Also, a biasing member 280 includes a first end pivotably mountable with respect to the floor 200 of the vehicle, and a second end pivotally coupled to the seat bottom leg 230 at a location intermediate the upper and lower ends of the seat bottom leg 230 to be pivotable about the second transmission pivot axis 273. The biasing member 280 may be pivotally coupled to the bracket 262 and may assist with single handed stowing of the seat assembly 3.

Referring to FIGS. 34-37, when the seat assembly 3 is pivoted from its deployed position of FIG. 34 toward its stowed position (FIG. 42), the seat bottom 210 and/or back 220 is/are dislocated or unlocked to permit the seat bottom 210 and the seat back 220 to move independently of one another. For example, the seat back 220 may be unlatched from its deployed position shown in FIG. 34 and pivoted and/or articulated forward in any suitable manner, such as by pulling on a rear mounted strap or lifting a side mounted lever that may be coupled to a seat latching and unlatching mechanism (not shown). The seat latching and unlatching mechanism may also pivot the head rest 225 to a stowed position.

Referring to FIGS. 36-39, the seat back 220 continues to articulate forward by way of the pivoting seat back legs 240, 250, and the motion of the pivoting first seat back leg 240 pulls the link 270 rearwardly, thereby pulling the seat bottom leg 230, which, in turn, assists with forward movement of the seat bottom 210 via at least the seat bottom link 212. At this point, the seat back latching and unlatching mechanism is still in its latched or detent state.

Figure 40:
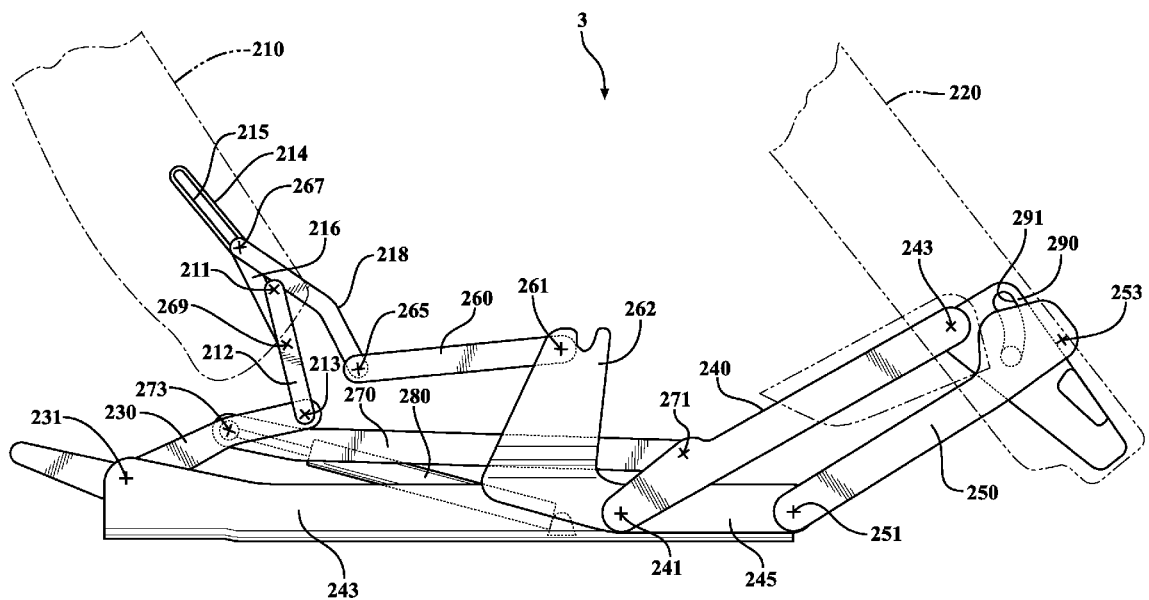
FIG. 40 is a left side view of the seat assembly of FIG. 38, illustrating the seat back being further articulated toward its stowed position, and the seat bottom being additionally articulated toward its stowed position.
Figure 41:
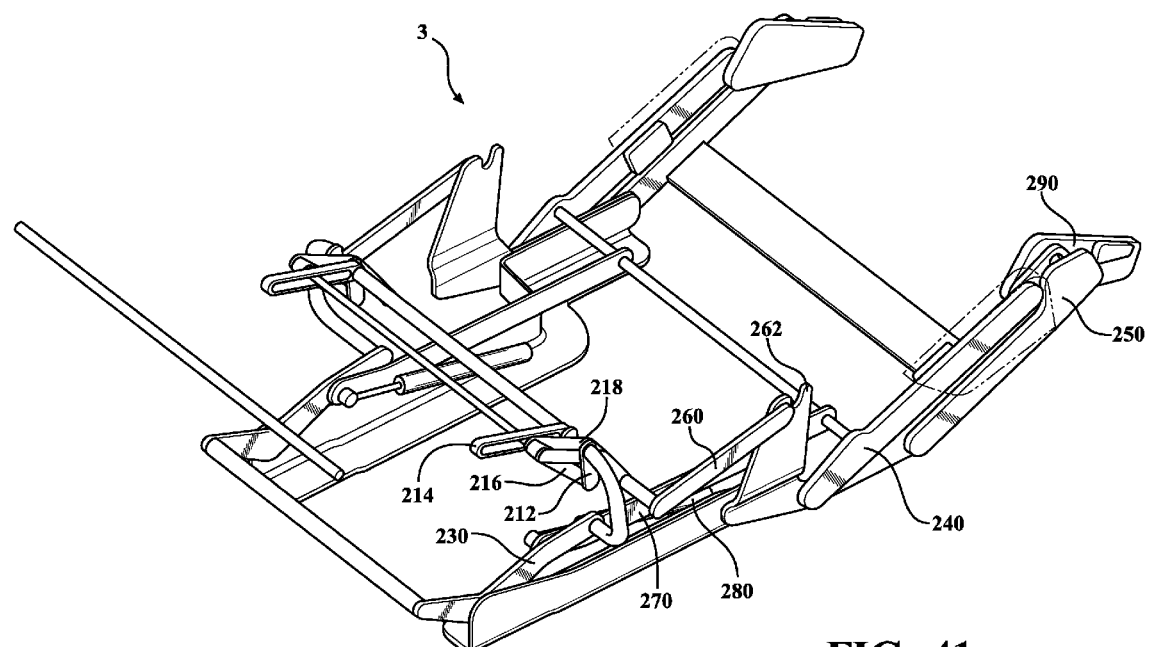
FIG. 41 is a left front perspective view of a portion of the seat assembly of FIG. 40.

Referring to FIGS. 40 and 41, the seat back 220 continues to articulate forward by way of the pivoting seat back legs 240, 250, and the motion of the pivoting first seat back leg 240 continues to pull the link 270 rearwardly, thereby pulling the seat bottom leg 230, which, in turn, assists with continued forward movement of the seat bottom 210 via at least the seat bottom link 212. At this point, the seat back latching and unlatching mechanism becomes unlatched by virtue of rotation of the cam 242 to disengage the detent mechanism 292 and allow the seat back 220 to pivot about the seat back pivot axis 243 (FIG. 33). As the seat bottom 210 swings in the direction of the front of the vehicle, the seat bottom leg 230 and the torsional linkage holds the seat bottom 210 in a detent position near the back of a seat (not shown) located directly in front of the seat assembly 3.

Figure 42:
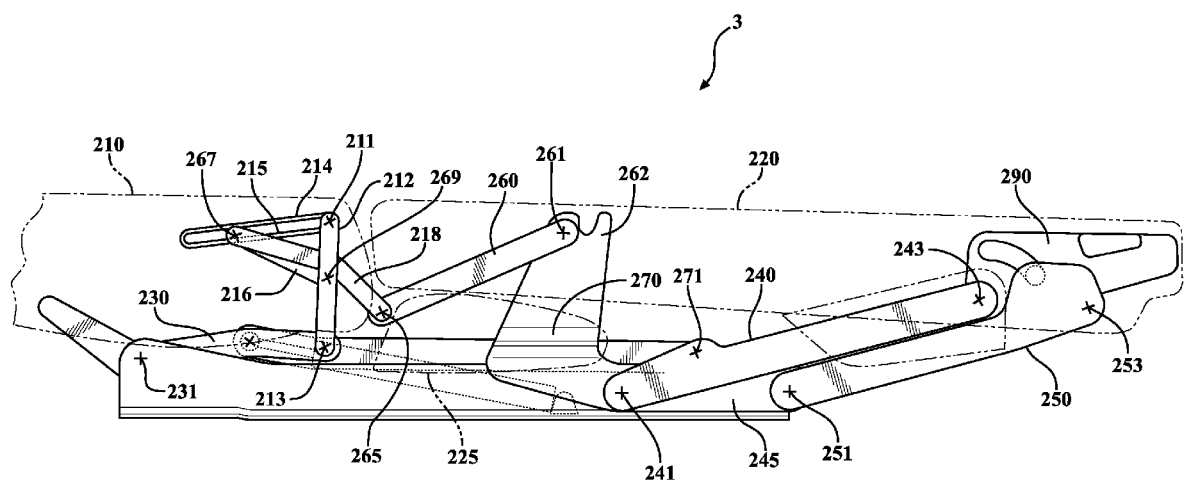
FIG. 42 is a left side view of the seat assembly of FIG. 40, illustrating the seat back and the seat bottom in their stowed positions to define at least a portion of a seating load floor.
Figure 43:
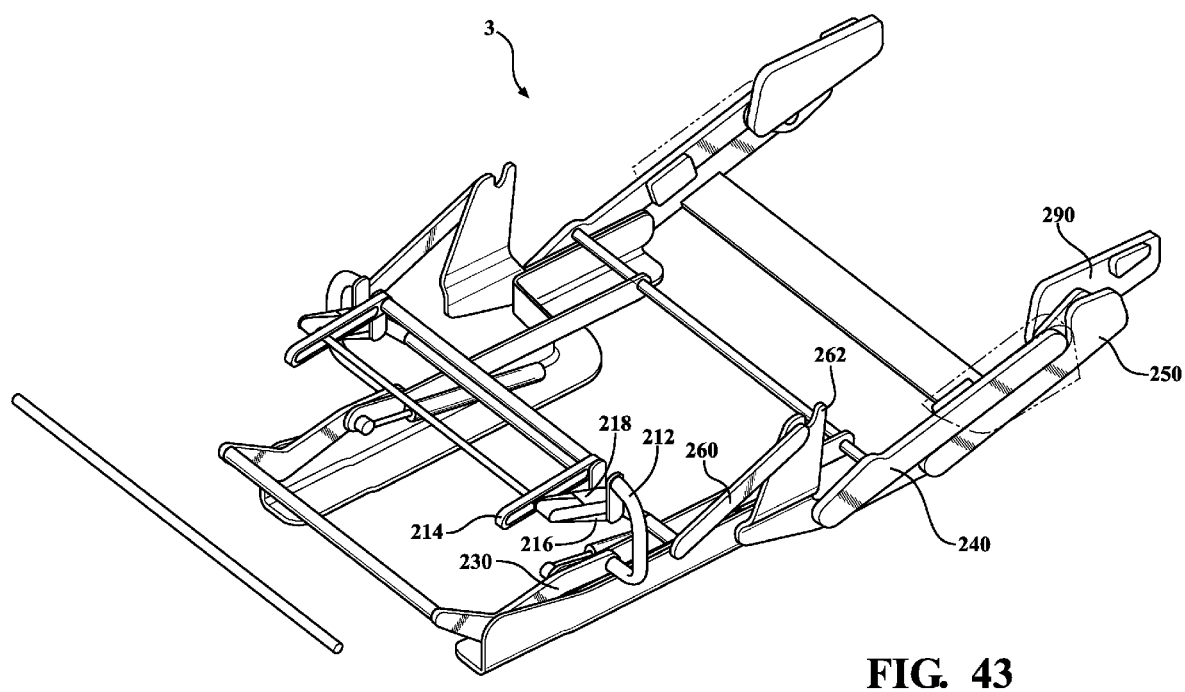
FIG. 43 is a left front perspective view of a portion of the seat assembly of FIG. 42.

Referring to FIGS. 41 and 42, the seat back 220 continues to articulate forward by way of the pivoting seat back legs 240, 250 and the pivoting of the seat back 220 about the seat back pivot axis 243. The motion of the pivoting first seat back leg 240 continues to pull the link 270 rearwardly, thereby pulling the seat bottom leg 230, which, in turn, assists with movement of the seat bottom 210 via at least the seat bottom link 212. Also, at this point, the slotted link 214 allows the seat bottom 210 to translate forward to make room for the upper portion of the seat back 220. A forward extension 232 of the seat bottom leg 230 projects upward to support the seat bottom 210 in its stowed position.

In this manner, the seat bottom 210 and the seat back 220 have been moved toward or against the floor 200 of the vehicle to a stowed position to at least partially define a seating load floor. In other words, the seat back 220 and seat bottom 210 are collapsed into the stowed position wherein the seat bottom 210 and seat back 220 are generally parallel with and resting on the floor 200 of the vehicle while the underside of the seat bottom 210 and the rear of the seat back 220 are facing upwards. Accordingly, passenger seating surfaces of the seat assembly 2 face down against the floor 200 and, thus, are protected from exposure to cargo. Accordingly, there is no need for flip over protective panels to protect such seating surfaces. As shown in FIG. 42, the head rest 225 may be pivoted in any suitable manner to a stowed position with respect to the rest of the seat back 220.

The foregoing description and drawings constitute exemplary embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations.

What is claimed is:

1. A seat assembly for a motor vehicle including a floor, comprising:
   at least one seat bottom leg having an upper end, and a lower end pivotably mountable with respect to the floor of the motor vehicle to be pivotable about a seat bottom leg pivot axis;
   at least one seat bottom link having a seat bottom end, and a leg end pivotally coupled to the upper end of the at least one seat bottom leg to be pivotable about a link pivot axis;
   a seat bottom having a rearward portion, and a forward portion pivotally coupled to the seat bottom end of the at least one seat bottom link to be pivotable about a seat bottom pivot axis;
   a seat back having an upper portion and a lower portion articulatably mountable with respect to the floor of the motor vehicle, the rearward portion of the seat bottom being detachably coupled to the seat back;
   at least one first seat back leg having a first lower end pivotably mountable with respect to the floor of the motor vehicle, and a first upper end pivotally coupled to the lower portion of the seat back to be pivotable about a first seat back pivot axis; and
   at least one second seat back leg having a second lower end pivotably mountable with respect to the floor of the motor vehicle, and a second upper end pivotally coupled to the lower portion of the seat back to be pivotable about a second seat back pivot axis;
   wherein the first seat back pivot axis is translatable, and the apparatus further comprises at least one rear link having a first end, and a second end pivotally coupled to the second upper end of the at least one second seat back leg to be pivotable about the second seat back pivot axis, wherein the first upper end of the at least one first seat back leg is pivotally coupled to the first end of the at least one rear link;
   wherein the seat bottom is dislocated from the seat back and the seat back and seat bottom are independently articulatable in a forward direction to fold the seat bottom and seat back down toward the floor of the vehicle to a stowed position to at least partially define a seating load floor.

2. The seat assembly of claim 1, wherein the at least one seat bottom link is a torsional member to pivotally bias the seat bottom for pivoting about the seat bottom pivot axis.

3. The seat assembly of claim 1, wherein the first and second lower ends of the at least one first seat back leg and at least one second seat back leg are pivotably mountable with respect to the floor by a common bracket that is secureable to the floor.

4. The seat assembly of claim 1, further comprising:
   a seat transmission linkage coupled between at least one of the seat back legs and the at least one seat bottom leg.

5. The seat assembly of claim 4, wherein the seat transmission linkage includes:

a first transmission link having a rearward end pivotally coupled about a first transmission pivot axis to the at least one first seat back leg at a location intermediate the lower and upper ends of the at least one first seat back leg;

a second transmission link having a first end, and a second end pivotally mountable with respect to the floor to be pivotable about a second transmission pivot axis;

a third transmission link having a first end pivotally coupled to the first end of the second transmission link to be pivotable about a third transmission pivot axis, and a second end pivotally coupled to the upper end of the at least one seat bottom leg to be pivotable about a fourth transmission pivot axis, wherein a forward end of the first transmission link is pivotally coupled to the first ends of the first and second links to be pivotable about the third transmission pivot axis; and a biasing member having a first end coupled to the first transmission link at a location intermediate the forward and rearward ends of the first transmission link, and a second end coupled to the at least one second seat back leg at a location intermediate the lower and upper ends of the at least one second seat back leg.

6. The seat assembly of claim 1, wherein the seat bottom is positioned forward of the upper portion of the seat back in the stowed position such that the seat bottom and seat back each rest on the floor of the vehicle.

7. The seat assembly of claim 6, wherein the seat bottom is inverted in the stowed position such that a passenger seating surface of the seat bottom is facing down against the vehicle floor in the stowed position and an opposite underside surface of the seat bottom is facing upward and partially defines the seating load floor.

8. The seat assembly of claim 7, wherein the forward portion of the seat bottom in the inverted position is positioned forward of the upper portion of the seat back.

9. The seat assembly of claim 7, wherein a rear side of the seat back opposite a front passenger receiving side of the seat back is generally parallel to the underside surface of the seat bottom in the stowed position, and the rear side of the seat back and the underside surface of the seat bottom are generally parallel to the vehicle floor in the stowed position.

10. A seat assembly for a motor vehicle including a floor comprising:

at least one seat bottom leg having an upper end, and a lower end pivotably mountable with respect to the floor of the motor vehicle to be pivotable about a seat bottom leg pivot axis;

at least one seat bottom link having a seat bottom end, and a leg end pivotally coupled to the upper end of the at least one seat bottom leg to be pivotable about a link pivot axis;

a seat bottom having a rearward portion, and a forward portion pivotally coupled to the seat bottom end of the at least one seat bottom link to be pivotable about a seat bottom pivot axis;

a seat back having a lower portion articulatably mountable with respect to the floor of the motor vehicle, wherein the seat bottom and the seat back are articulatable in a forward direction to fold the seat bottom and seat back down toward the floor of the vehicle to at least partially define a seating load floor;

at least one first seat back leg having a first lower end pivotably mountable with respect to the floor of the motor vehicle, and a first upper end pivotally coupled to the lower portion of the seat back to be pivotable about a first seat back pivot axis;

at least one second seat back leg having a second lower end pivotably mountable with respect to the floor of the motor vehicle, and a second upper end pivotally coupled to the lower portion of the seat back to be pivotable about a second seat back pivot axis; and a seat transmission linkage coupled between at least one of the seat back legs and the at least one seat bottom leg, the seat transmission link including:

a first link having a first end pivotally coupled to the at least one first seat back leg at a location intermediate the upper and lower ends of the at least one first seat back leg to be pivotable about a first transmission pivot axis, and a second end pivotally coupled to the at least one seat bottom leg at a location intermediate the upper and lower ends of the at least one seat bottom leg to be pivotable about a second transmission pivot axis; and a biasing member having a first end pivotally mountable with respect to the floor of the motor vehicle, and a second end pivotally coupled to the at least one seat bottom leg at a location intermediate the upper and lower ends of the at least one seat bottom leg to be pivotable about the second transmission pivot axis.

11. A seat assembly for a motor vehicle including a floor comprising:

at least one seat bottom leg having an upper end, and a lower end pivotably mountable with respect to the floor of the motor vehicle to be pivotable about a seat bottom leg pivot axis;

at least one seat bottom link having a seat bottom end, and a leg end pivotally coupled to the upper end of the at least one seat bottom leg to be pivotable about a link pivot axis;

a seat bottom having a rearward portion, and a forward portion pivotally coupled to the seat bottom end of the at least one seat bottom link to be pivotable about a seat bottom pivot axis;

a seat back having a lower portion articulatably mountable with respect to the floor of the motor vehicle;

at least one first seat back leg having a first lower end pivotably mountable with respect to the floor of the motor vehicle, and a first upper end pivotally coupled to the lower portion of the seat back to be pivotable about a first seat back pivot axis;

at least one second seat back leg having a second lower end pivotably mountable with respect to the floor of the motor vehicle, and a second upper end pivotally coupled to the lower portion of the seat back to be pivotable about a second seat back pivot axis; and at least one rear link pivotally coupled to the first upper end of the at least one first seat back leg to be pivotable about the first seat back pivot axis, pivotally coupled to the second upper end of the at least one second seat back leg to be pivotable about the second seat back pivot axis, and translatably coupled to the lower portion of the seat back;

wherein the seat bottom and the seat back are articulatable in a forward direction to fold the seat bottom and seat back down toward the floor of the vehicle to at least partially define a seating load floor.

12. The seat assembly of claim 11, further comprising an automatic seat back latching and unlatching mechanism to prevent movement of the seat back from interfering with movement of the seat bottom before the seat bottom has moved out of the path of the seat back.

* * * * *